(12) United States Patent
Wang et al.

(10) Patent No.: US 10,684,230 B2
(45) Date of Patent: Jun. 16, 2020

(54) DEVICE AND METHOD FOR SCREENING GEMSTONES

(71) Applicant: Gemological Institute of America (GIA), Carlsbad, CA (US)

(72) Inventors: Wuyi Wang, Carlsbad, CA (US); Tsung-Han Tsai, Carlsbad, CA (US)

(73) Assignee: Gemological Institute Of America, Inc. (GIA), Carlsbad, CA (US)

( * ) Notice: Subject to any disclaimer, the term of this patent is extended or adjusted under 35 U.S.C. 154(b) by 0 days.

(21) Appl. No.: 15/817,990

(22) Filed: Nov. 20, 2017

(65) Prior Publication Data

US 2018/0172599 A1 Jun. 21, 2018

Related U.S. Application Data

(63) Continuation of application No. PCT/US2017/062409, filed on Nov. 17, 2017.

(60) Provisional application No. 62/435,045, filed on Dec. 15, 2016.

(51) Int. Cl.
*G01N 21/87* (2006.01)
*G01N 21/64* (2006.01)
*G01J 3/28* (2006.01)

(52) U.S. Cl.
CPC .......... *G01N 21/87* (2013.01); *G01N 21/645* (2013.01); *G01N 21/6489* (2013.01); *G01J 2003/2843* (2013.01); *G01N 2021/6471* (2013.01); *G01N 2021/6484* (2013.01)

(58) Field of Classification Search
CPC .................. G01N 21/87; G01N 21/645; G01J 2003/2843
See application file for complete search history.

(56) References Cited

U.S. PATENT DOCUMENTS

| | | | | | |
|---|---|---|---|---|---|
| 4,824,249 A | * | 4/1989 | Lucas | ................... | G01N 21/67 356/311 |
| 6,002,477 A | * | 12/1999 | Hammer | .................. | G01J 3/42 356/307 |
| 2013/0016210 A1 | | 1/2013 | Smith | | |
| 2013/0293116 A1 | * | 11/2013 | Carreras Molins | ......... | H05B 33/0872 315/152 |
| 2013/0321792 A1 | | 12/2013 | Shapiro | | |
| 2016/0178530 A1 | * | 6/2016 | Davies | .................. | G01N 21/87 209/578 |

FOREIGN PATENT DOCUMENTS

| | | |
|---|---|---|
| CN | 202383072 U | 8/2012 |
| WO | WO 2016161016 A1 * 10/2016 | ......... G01N 21/6456 |

OTHER PUBLICATIONS

International Search Report and Written Opinion received for PCT Patent Application No. PCT/US2017/062409, dated Feb. 5, 2018, 11 pages.
International Preliminary Report on Patentability received for PCT Patent Application No. PCT/US2017/062409, dated Jun. 27, 2019, 9 pages.

\* cited by examiner

*Primary Examiner* — Michael C Bryant
(74) *Attorney, Agent, or Firm* — DLA Piper LLP (US)

(57) ABSTRACT

Disclosed herein are devices and methods for screening gemstones (e.g., diamonds). In particular, the disclosed method and system can efficiently and accurately identify and distinguish genuine earth-mined gemstones (e.g., diamond) from synthetic and treated gemstones or gemstone simulants.

22 Claims, 26 Drawing Sheets

Using a band passed LED to eliminate LED's reflection in the measurement

- 385 nm LED generates detectable spectral density above 400 nm which could interfere our screening
- The 390 nm short pass filter can eliminate the spectral density after 400 nm
- This filter might cut ~75% of the LED output 390 short pass filter and 409 long pass filter can successfully separate the excitation and the fluorescence

| # | Lightness | Chroma | Hue | Strength | N3/Raman |
|---|---|---|---|---|---|
| 1 | 30.08191 | 30.58725 | -75.6793 | Medium | 11.46 |
| 2 | 34.99132 | 33.42362 | -75.8413 | Medium | 26.82 |
| 3 | 32.98542 | 32.26819 | -75.8218 | Medium | 30.1 |
| 5 | 21.04035 | 24.67616 | -75.8081 | Faint | 6.25 |
| 6 | 17.56447 | 22.96961 | -75.7458 | Faint | 2.34 |
| 4 | 8.285715 | 21.5786 | -75.271 | None | 0.34 |
| 7 | 0.470899 | 138.5251 | -132.758 | None | N/A |
| 8 | 1.581295 | 163.8112 | -134.369 | None | 0.08 |
| 9 | 0.293289 | 138.122 | -132.878 | None | 0.002 |
| 10 | 0.080985 | 181.0193 | -135 | None | N/A |

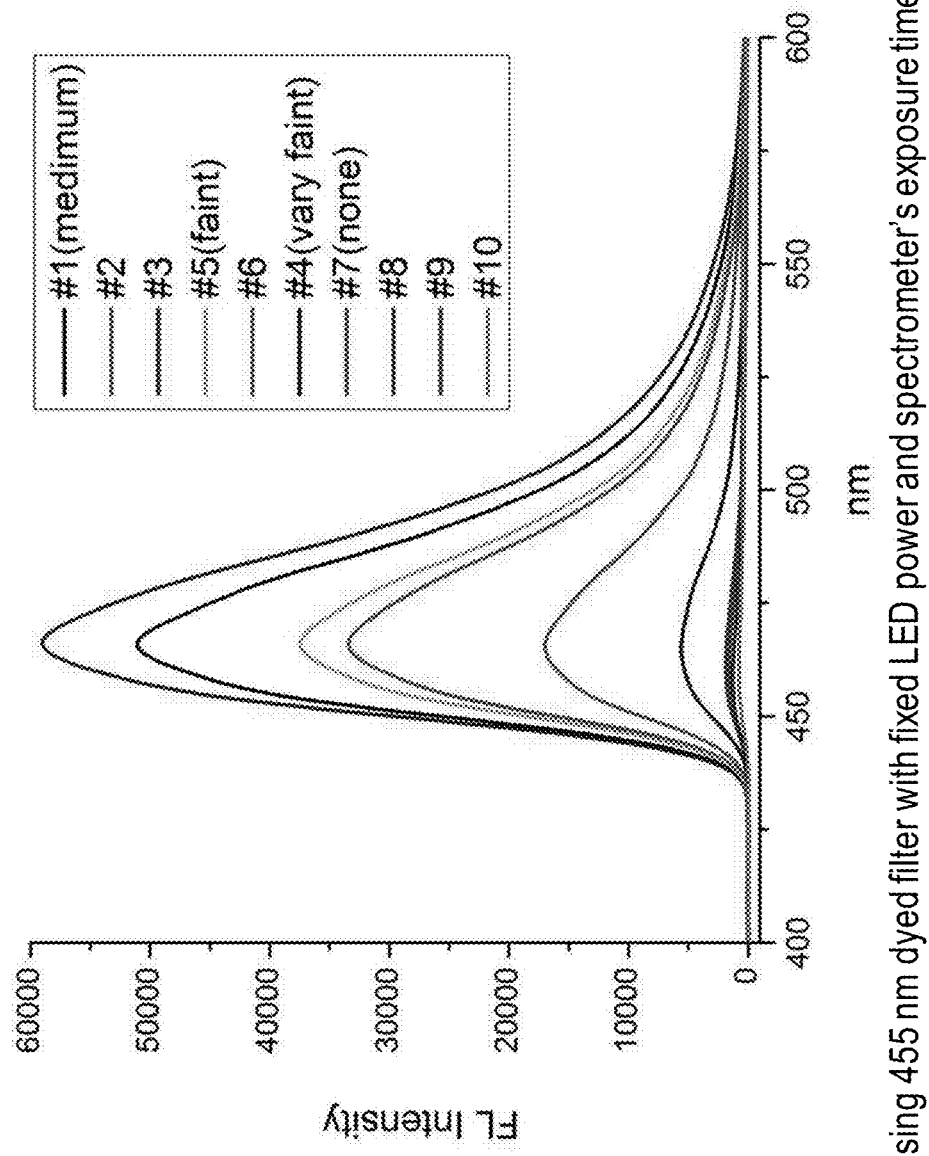

- No or very weak fluorescence in synthetics and diamond simulants
- Colorless diamonds with N3 center can be concluded as natural (mined) diamonds Commonly used light sources for office illumination

DEVICE AND METHOD FOR SCREENING GEMSTONES

CROSS-REFERENCE TO RELATED APPLICATIONS

This application claims priority to PCT International Patent Application PCT/US17/62409, filed 17 Nov. 2017 and entitled "Device and Method for Screening Gemstones," which claims benefit and priority to U.S. Provisional Patent Application No. 62/435,045, filed 15 Dec. 2016 and entitled "Device and Method for Screening Gemstones," all of which are hereby incorporated by reference herein in their entirety.

FIELD OF THE INVENTION

The disclosed apparatus, system and method relate to the field of gemstone authentication. In particular, the apparatus, system, and method relate to how earth-mined genuine gemstones can be distinguished from those grown by artificial means. Gemstones suitable for the current analysis include but not are limited to colorless natural diamonds, pink diamonds, other natural diamonds, non-diamond material such as corundum (ruby, sapphire), emerald, zoisite, and spinel.

BACKGROUND

Man-made gemstones are becoming more prevalent in the market; e.g., synthetic diamonds obtained using high-pressure high-temperature (HPHT) methods or chemical vapor deposition (CVD). Screening devices that are currently available on the market are based on technologies relating to UV absorption and/or transmission rate and UV-vis absorption spectroscopy. These devices are associated with numerous defects such as high false refer rate, limited sensor dynamic range, limited range of sample size and cut, failure to analyze mounted diamonds, and etc.

There are needs for methods and systems for efficiently and accurately identifying and distinguishing genuine earth-mined gemstones (e.g., diamond) from synthetic and treated gemstones or gemstone simulants.

SUMMARY OF THE INVENTION

In one aspect, disclosed herein is a screening device for gemstones that comprises: an LED light source for providing radiation to a gemstone at or near a pre-set excitation wavelength, wherein the LED light source is coupled with a short pass filter that substantial passes radiation below a first predetermined wavelength, and wherein the first predetermined wavelength is longer than the excitation wavelength; a fluorescence detector coupled with a long pass filter that substantially passes radiation above a second predetermined wavelength, wherein only radiation above the second predetermined wavelength is received at the fluorescence detector, wherein the second predetermined wavelength is longer than the first predetermined wavelength; and a fiber optic probe that is connected to both the LED light source and the fluorescence detector, wherein the fiber probe is configured to deliver the radiation from the LED light source to the gemstone and to receive fluorescence emitted from the gemstone and send to the fluorescence detector.

In one aspect, disclosed herein is a gemstone screening and analysis system that comprises a screening device and a computer device communicatively connected to the screening device, wherein the computer device provides a user interface for receiving one or more commands from a user and controls the screening device based on the one or more commands. The screening device comprises: an LED light source for providing radiation to a gemstone at or near a pre-set excitation wavelength, wherein the LED light source is coupled with a short pass filter that substantially passes radiation below a first predetermined wavelength, and wherein the first predetermined wavelength is longer than the excitation wavelength; a fluorescence detector coupled with a long pass filter that substantially passes radiation above a second predetermined wavelength, wherein only radiation above the second predetermined wavelength is received at the fluorescence detector, wherein the second predetermined wavelength is longer than the first predetermined wavelength; and a fiber probe that is connected to both the LED light source and the fluorescence detector, wherein the fiber probe is configured to deliver the UV radiation from the LED light source to the gemstone and to receive fluorescence emitted from the gemstone and send to the fluorescence detector.

In some embodiments, the pre-set excitation wavelength is at or near 405 nm or shorter. In some embodiments, the pre-set excitation wavelength is set at 385 nm. In some embodiments, the LED light source is placed on a heat sink. In some embodiments, the LED light source is coupled with a band pass filter.

In some embodiments, the first predetermined wavelength can be a wavelength between around 360 and 405 nm. In some embodiments, the second predetermined wavelength can be a wavelength between around 405 to 413 nm. In some embodiments, the second predetermined wavelength can be a wavelength shorter than 405 nm so long as it is greater than the first predetermined wavelength.

In some embodiments, the fiber optic probe is connected to an optical cable comprising two or more optical fibers. In some embodiments, the optical cable connected to the fiber optic probe is split into at least two optical cables comprising a first optical cable connected to the LED light source and a second optical cable connected to the fluorescence detector.

In one aspect, disclosed herein is a method for screening a gemstone based on its fluorescence emission. The method comprises the steps of: applying radiation at or near a pre-set excitation wavelength to a gemstone by placing an optic fiber probe near or touching the gemstone, wherein the radiation is rendered by coupling a short pass filter with a light source, wherein the short pass filter is set at a first predetermined wavelength that is longer than the pre-set excitation wavelength; receiving, using the optic fiber probe, fluorescence emission from the gemstone; applying a long pass filter to the fluorescence emission to render modified fluorescence emission, wherein the long pass filter has a second predetermined wavelength; and characterizing the gemstone based on one or more measurements of the modified fluorescence emission. In some embodiments, the one or more measurements are obtained using a fluorescence detector. In some embodiments, the radiation being applied comprises UV radiation. In some embodiments, the method disclosed herein is used for identifying the mineral type of a gemstone.

In one aspect, disclosed herein is a non-transitory computer-readable medium storing a gemstone screening application executable by at least one processor. The gemstone screening application comprises sets of instructions for: applying UV radiation at or near a pre-set excitation wavelength to a gemstone by placing an optic fiber probe near or touching the gemstone, wherein the UV radiation is rendered by coupling a short pass filter with a UV light source, wherein the short pass filter is set at a first predetermined wavelength that is longer than the pre-set excitation wavelength; receiving, using the optic fiber probe, fluorescence emission from the gemstone; applying a long pass filter to the fluorescence emission to render modified fluorescence emission, wherein the long pass filter has a second predetermined wavelength; and characterizing the gemstone based on one or more measurements of the modified fluorescence emission.

In some embodiments, the method further comprises conducting ambient light calibration. In some embodiments, conducting ambient light calibration comprises: touching the gemstone with the fiber optic probe while the UV light source is turned off; measuring ambient light spectrum; and calibrating for ambient light by setting the measured ambient light spectrum as the background spectrum for subsequent measurements.

In some embodiments, the method further comprises conducting dark calibration. In some embodiments, conducting dark calibration comprises: collecting measurements of dark signals by eliminating light entry into the fluorescence detector; and calibrating for dark signals by setting the measured dark signals as an absence of optical signals.

In some embodiments, the one or more measurements are obtained with a fluorescence detector.

In some embodiments, the pre-set excitation wavelength is at or near 405 nm or shorter. In some embodiments, the pre-set excitation wavelength is set at 385 nm. In some embodiments, the LED light source is placed on a heat sink. In some embodiments, the LED light source is coupled with a band pass filter.

In some embodiments, the first predetermined wavelength can be a wavelength between around 360 and 405 nm. In some embodiments, the second predetermined wavelength can be a wavelength between around 405 to 413 nm. In some embodiments, the second predetermined wavelength can be a wavelength shorter than 405 nm so long as it is greater than the first predetermined wavelength.

In some embodiments, the fiber optic probe is connected to an optical cable comprising two or more optical fibers.

In some embodiments, the optical cable connected to the fiber optic probe is split into at least two optical cables comprising a first optical cable connected to the LED light source and a second optical cable connected to the fluorescence detector.

One of skill in the art would understand that any embodiments disclosed herein, when applicable, can be applied to any aspect of the invention.

BRIEF DESCRIPTION OF THE DRAWINGS

Those of skill in the art will understand that the drawings, described below, are for illustrative purposes only. The drawings are not intended to limit the scope of the present teachings in any way.

FIG. 6C depicts an exemplary embodiment, showing the effects of a 455 dyed filter on the 10 samples with varied amount of blue fluorescence.

DETAILED DESCRIPTION OF THE INVENTION

Definitions

Techniques for creating synthetic gemstones (e.g., diamonds) have become more sophisticated; high-quality synthetic gemstones are very close in appearance to earth-mined genuine gemstones, making it almost impossible for one to distinguish using naked eyes. However, there are fundamental differences between earth-mined genuine gemstones and the synthetic ones.

One of such differences is natural gemstones' ability to emit fluorescence upon exposure to a light source, for example, a UV light source. For example, luminescence analysis is a highly sensitive and accurate method of detecting diamond's crystallographic defects. The vast majority of natural diamonds typically include nitrogen related defects, which can generate visible optical signals under UV excitation. Synthetic diamonds and diamond simulants, on the other hand, do not include the same nitrogen related defects as most mined diamonds do. Therefore, mined diamond can be easily identified through luminescence analysis.

Fluorescence detection in diamonds is used as an example. However, it should in no way limit the scope of the invention. The systems, apparatus, and methods disclosed herein can be applied to any type of gemstones, including but not limited to diamond, ruby, sapphire, emerald, opal, aquamarine, peridot and cymophane (cat's eye), andalusite, axinite, cassiterite, clinohumite, red beryl, and etc.

As disclosed herein, the terms "natural gemstones," "authentic gemstones," "earth-mined gemstones," and "real gemstones" are used interchangeably.

As disclosed herein, the terms "probe," "fiber probe," "fiber optic probe" are used interchangeably.

Figure 1A:
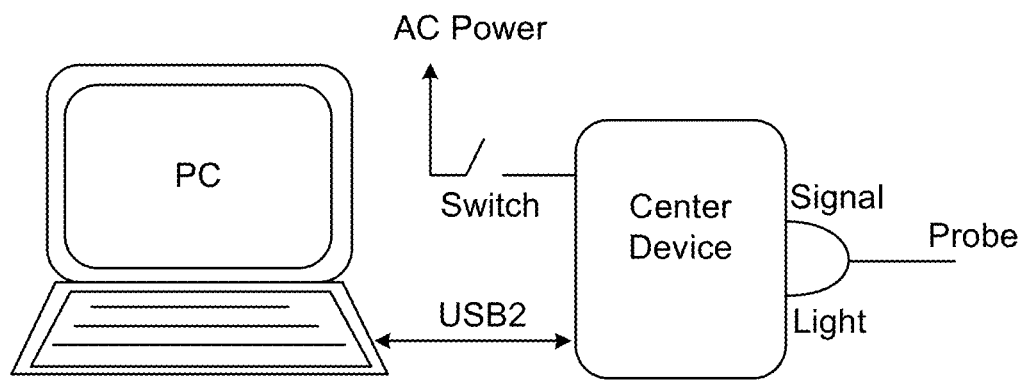
FIG. 1A depicts an exemplary embodiment of a system for screening gemstones.

In one aspect, disclosed herein is a system for identifying natural gemstone (e.g., FIGS. 1A-1E). FIG. 1A depicts an exemplary setup of a gemstone screening system, which includes a computer, a screening device (including an optic probe), power source, and various connecting cables.

The optical design of the current system differs from what is known in the art (e.g., Chinese Patent No. CN 202383072 U) in many aspects, including the light source, light collection method, and wavelength separation method. In particular, the system uses an optic probe in open space, making it possible to measure both loose and mounted melee diamonds.

Figure 1B:
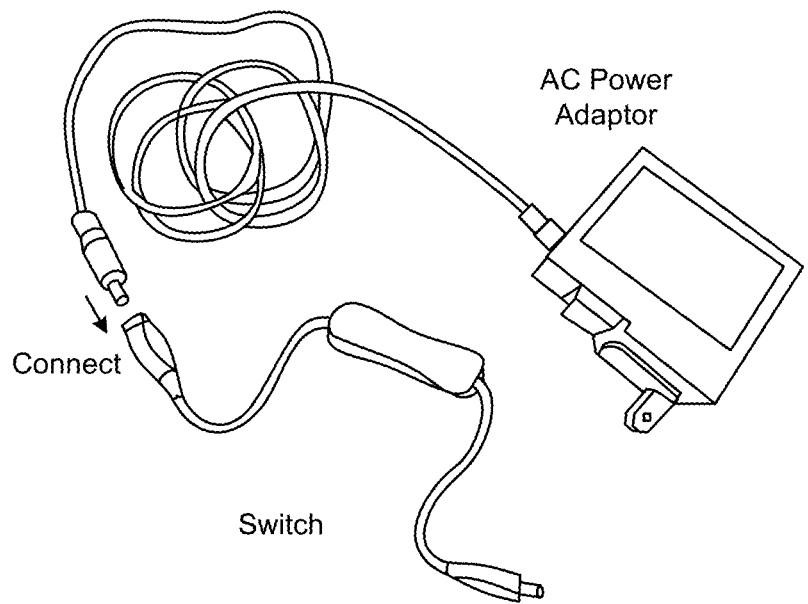
FIG. 1B depicts an exemplary embodiment.
Figure 1C:
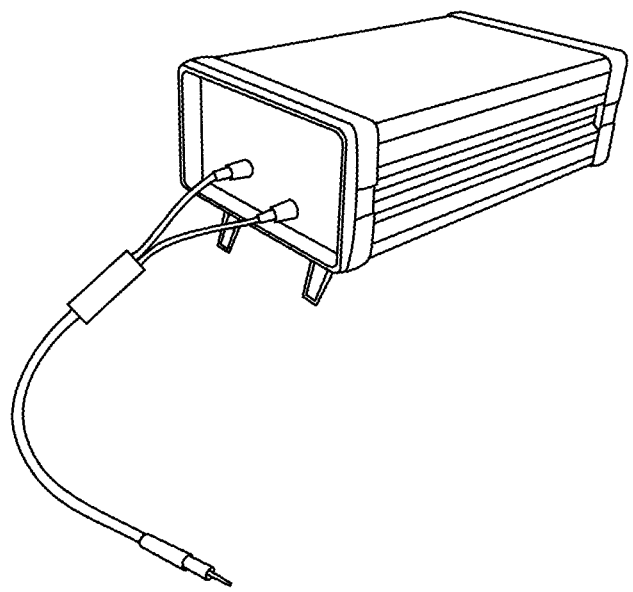
FIG. 1C depicts an exemplary embodiment.

FIG. 1B shows a power supply. FIG. 1C shows a sample screening device: most components of the device are hidden from view in a box. A key feature of the device is an extended probe that is completely exposed and outside the box. The probe is used to make contact with a gemstone during analysis. Many existing portable gemstone screening devices have an enclosed platform where a gemstone can be placed prior to analysis. The platform is within a compartment that is closed to the outside during analysis. These screening devices do not use a probe, much less an external probe.

Figure 1D:
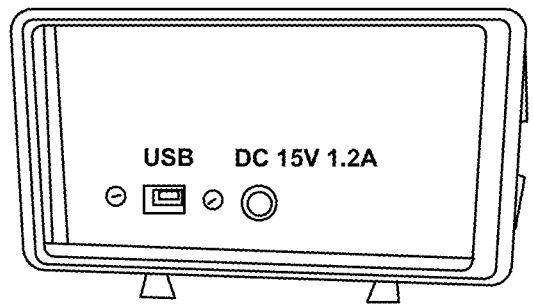
FIG. 1D depicts an exemplary embodiment.
Figure 1E:
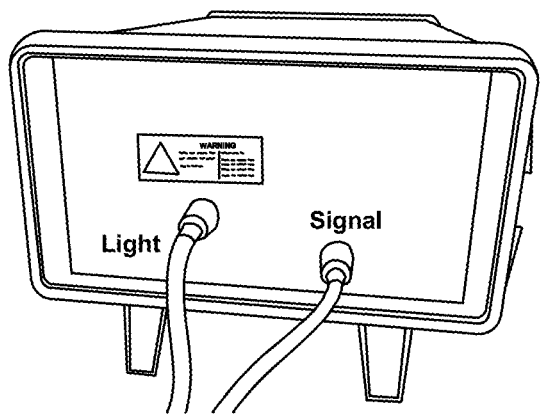
FIG. 1E depicts an exemplary embodiment.

FIG. 1D shows how the device can be connected to power source and a computer (via a USB port). FIG. 1E shows that radiation from the UV light source (inside the box) is delivered from the box via a first port; and optical signals collected from the gemstone are fed into the box via a separate port.

The sample system depicted in FIG. 1A includes the following items:
Mounted Diamond Screening Device—1 pcs
AC/DC wall mount adaptor 15V 36 W—1 pcs
In-line power switch—1 pcs
USB 2.0 A to USB 2.0 B cable—1 pcs
Fiber probe—1 pcs The system can be initiated according to the following. First, front and rear panel connections (e.g., FIGS. 1D and 1E) are completed by connecting the rear panel and the computer with a USB cable; connecting power cable; connecting the fiber probe to the front panel while keeping the switch off. Here, it is important that the fiber legs are not switched. A hint label for the light source is on the fiber. It is recommended that both fiber legs be connected to the device at the same time to avoid bending the fiber.

Figure 1F:
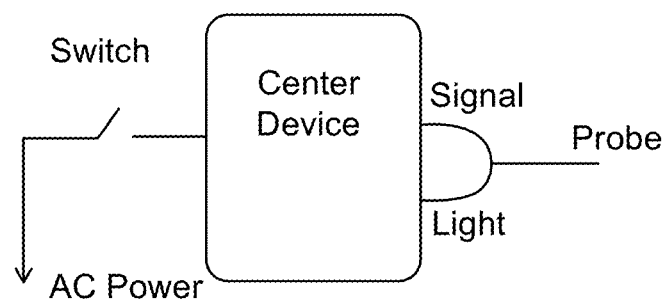
FIG. 1F depicts an exemplary embodiment.

FIG. 1F shows a schematic illustration of another exemplary screening device, including a center device, probe, power adaptor and switch. In such embodiments, a separate computer device is not needed. For example, the center device can include a display for displaying results of the analysis. In some embodiments, the center device includes one or more push buttons allowing a user to select various options to proceed with a test process. In some embodiments, the center device includes a computer microchip with a processor and memory for executing the method steps for carrying out a testing process. In some embodiments, the display is a touch screen. For example, a user can select options from a menu displayed on the touch screen. Physical buttons are no longer necessary. In some embodiments, the microchip can control the light source. For example, the UV light source (e.g., one or more UV LEDs) can be turned on or off by the microchip through menu options displayed on a touch screen.

In some embodiments, testing results can be announced verbally via a speaker.

In some embodiments, the exemplary embodiment of FIG. 1F maintains some of the structural components, including an external probe that is connected to the center device via two optical fibers: one for providing UV light source to a sample stone being tested and the other for collecting fluorescence signals from the sample stone. In some embodiments, the optical fibers split into two optical cables before each being connected to the center device (e.g., FIGS. 1C and 1E). In some embodiments, the two optical cable are labelled to show their differences; for example, with text labels or codes or different colors. In some embodiments, the optical fiber can split after entering the center device. Other suitable configurations may also be used.

In some embodiments, the center device of FIG. 1F can include a memory port such as a USB port. The memory port allows a user to save and transfer test results, for example, via a USB memory key. In some embodiments, the center device can also include a network communication port to provide network connection.

Figure 1G:
FIG. 1G depicts an exemplary embodiment.

FIG. 1G shows an exemplary test device with a touch screen display and an external probe. Exemplary menu designs on a touch screen can be found in FIGS. 12A-12E.

Figure 2B:
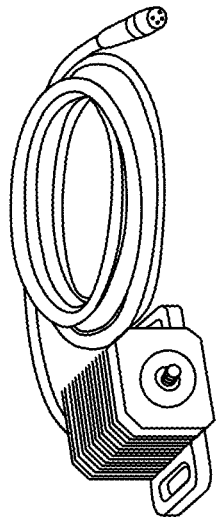
FIG. 2B depicts an exemplary embodiment.
Figure 2C:
FIG. 2C depicts an exemplary embodiment.
Figure 2A:
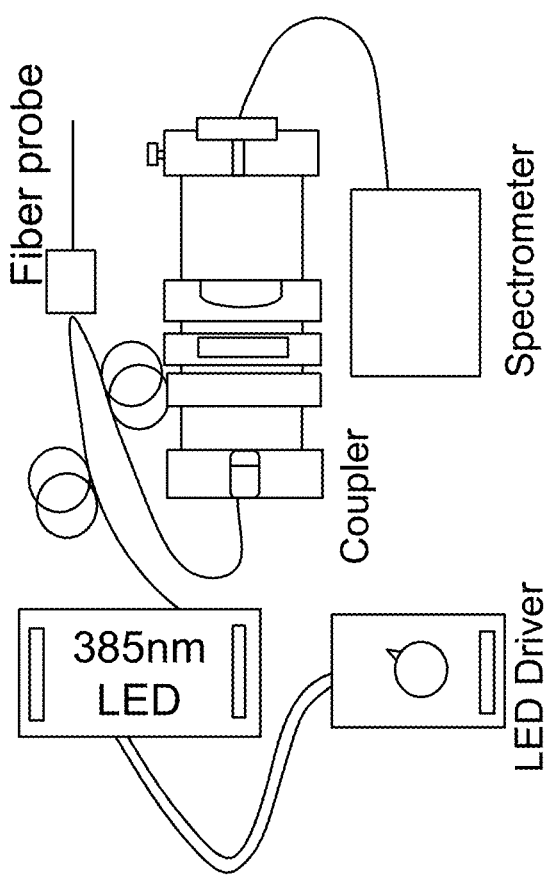
FIG. 2A depicts an exemplary embodiment of a device for screening gemstones.

In one aspect, disclosed herein is an exemplary screening system for identifying a natural gemstone (e.g., FIGS. 2A-2D). FIG. 2A shows an LED light source that is designed to emit light at 385 nm. On one hand, light from the light source is delivered to a gemstone via a fiber probe. On the other hand, light (e.g., fluorescence emission) collected by the probe from a gemstone passes through a coupler and reaches a spectrometer for measurements and characterization. In some embodiments, one or more LED light source having a wavelength other than 385 nm can be used. As disclosed herein, an LED light source can have a wavelength spread of about 15 nm, about 10 nm, or about 5 nm. In some embodiments, an LED light source can have a wavelength spread larger than 15 nm or smaller than 5 nm.

One of skill in the art can select an LED light having a wavelength or a wavelength range that is most suitable for the sample being analyzed. For example, any wavelength between 360 nm and 405 nm can result in absorption and subsequent fluorescence in natural diamonds. However, a natural diamond has strong absorption peaks at 385, 395, and 403 nm, where 385 is the strongest. As such, a light source of around 385 nm will produce the best fluorescence results.

FIG. 2B shows a sample LED light source. FIG. 2C shows a long pass filter (e.g., having a wavelength of 409 nm or 410 nm) that can be used in the coupler between the probe and the spectrometer to enhance signal detection.

Figure 2D:
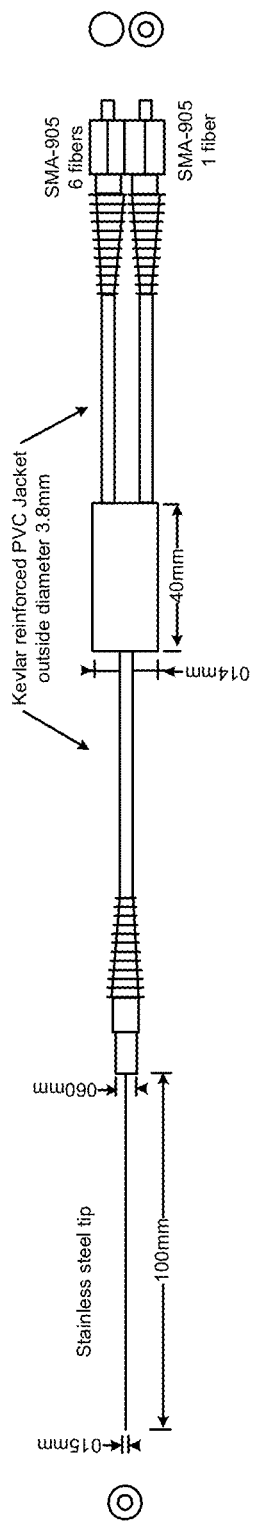
FIG. 2D depicts an exemplary embodiment.

FIG. 2D depicts an exemplary reflection probe with a probe tip, in order to effectively deliver and collect light to and from a gemstone. In some embodiments, the probe size is smaller than the size of a gemstone. In some embodiments, the sample gemstone can be slightly smaller than the probe. In general, a smaller fiber probe can provide better spatial resolution. For example, a reflection probe with a small tip can be used. A (very) small tip is desirable to do reflectance measurements. In some embodiments, the small tip reflection probe has a probe diameter that is 5 mm or smaller, 4 mm or smaller, 3 mm or smaller, 2 mm or smaller, or 1 mm or smaller. In some embodiments, the probe diameter is 1.5 mm. In some embodiments, the probe diameter is 2.5 mm. The probe can have any suitable length; for example, 200 mm or shorter, 150 mm or shorter, 100 mm or shorter, 50 mm or shorter, 25 mm or shorter, or 10 mm or shorter. In some embodiments, the probe can have a length that is 200 mm or longer.

In some embodiments, the probe can be configured with an illumination leg with six 200 μm fiber cables which connects to a fiber coupled light source and a single 200 μm read fiber cable to measure the reflection via connection to a spectrometer.

In some embodiments, an optical slit is used in the spectrometer to limit the throughput while improving spectral resolution. The slit can be of any size suitable for a particular analysis, including but not limited to, for example, 50 micron or smaller, 75 micron or smaller, or 100 micron or smaller. In some embodiments, a slit larger than 100 micron can be used.

A special angled fiber holder (AFH-15) is available for the 1.5 mm diameter reflection probe. In some embodiments, the device enables reflection measurements under angles of 15, 30, 45, 60, 75 and 90 degrees.

A screening device as disclosed herein has numerous capacities, including but not limited to, for example, identifying colorless to near colorless (e.g. from D to Z color grade) natural diamonds and brown diamonds from synthetic diamonds, treated diamonds, and diamond simulants; testing on mounted diamonds in jewelry settings; testing on loose diamonds with diameters preferably larger than 0.9 mm (approx. 0.005 carat size) and providing real-time testing results in about 3 seconds or less with both visual and sound notifications. In some embodiments, test results can be provided in 2 seconds or less.

This device is developed and designed based on its screening function. The device itself does not have a user interface for receiving user commands. Instead, software operated from the computer automatically collects and analyzes the signal to detect diamond's luminescence patterns. It identifies natural diamond based on the existence of those diamond's luminescence patterns, while referring samples without those patterns for further testing.

This device can be used for both loose diamond and mounted jewelry testing. It is designed for colorless to near colorless (D to Z color grade) diamonds and brown diamonds with any shapes. A fiber probe guides the UV light source to excite the luminescence effect, if present, of the tested sample and then collects the optical signal into the sensor inside the device. The device's software provides an easy reading result on the screen with sound notification, which enables the user to use both hands while performing the testing.

If natural diamond's luminescence patterns are detected by the device, a positive or "PASS" testing result will be displayed, indicating that the test sample is an earth mined natural diamond. If diamond's luminescence patterns are not detected, a non-positive or "REFER" testing result will be displayed, indicating that the tested sample could be a synthetic diamond, a treated diamond, or a diamond simulant, which should be referred for further testing.

Figure 3A:
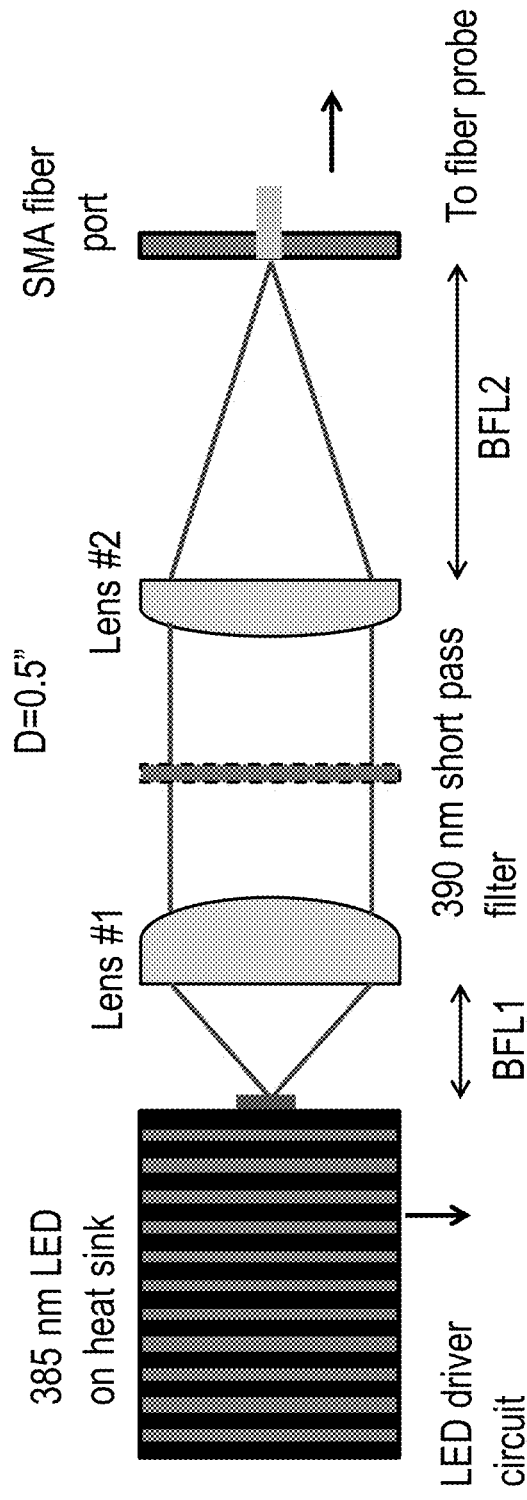
FIG. 3A depicts an exemplary embodiment of a LED light source.

FIG. 3A illustrates how UV radiation from an LED light source can be optimized before it is delivered to the fiber probe and shone on the gemstone. In some embodiments, a band passed LED is used to eliminate LED reflection in measurements. In some embodiments, an LED light source is placed on a heat sink for effective cooling to ensure proper function. In the example scheme shown, UV radiation from the LED light source first reaches lens #1 which is positioned at a first back focal length (BFL1) from the LED light source. In some embodiments, collimated light passes through a short pass filter configured to have a first predetermined wavelength (e.g., at 390 nm). As such, only light wavelength that is shorter than 390 nm can pass the filter and reach lens #2. Fiber port connected to the fiber probe is located at a second back focal length (BFL2) from the lens #2. Lens #2 focuses the parallel beams from the short pass filter and delivers the resulting light to the fiber probe.

Figure 3B:
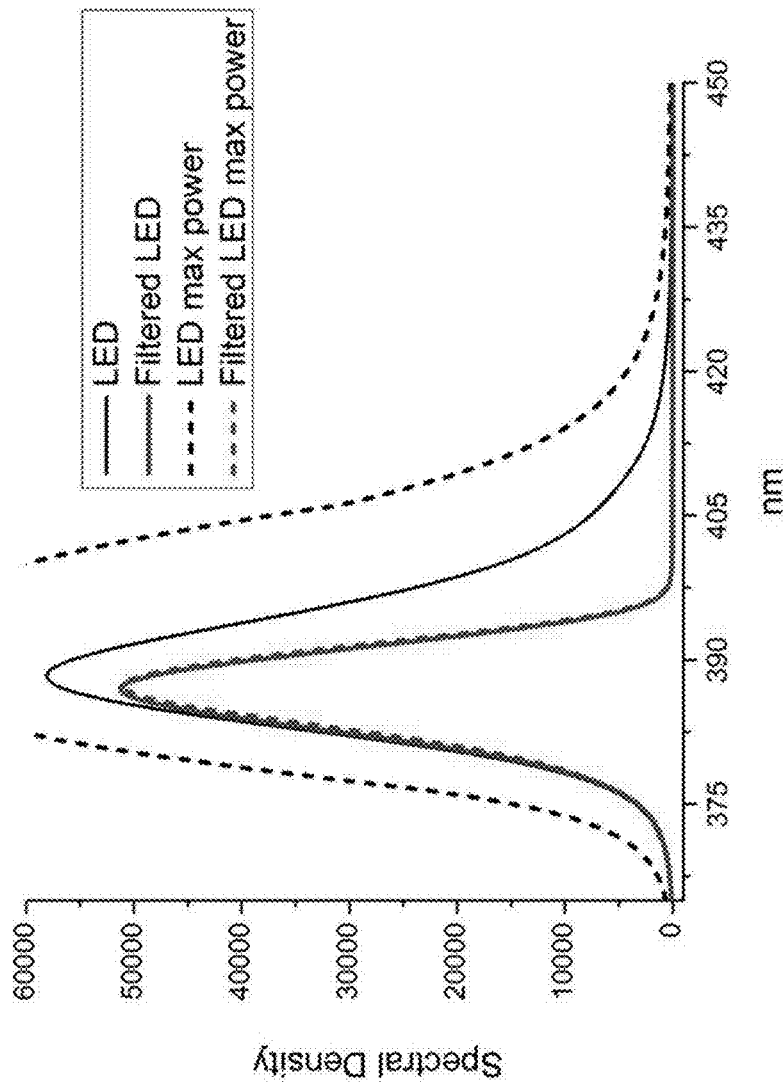
FIG. 3B depicts an exemplary embodiment, showing the effects of coupling a short pass filter with an LED light source.

The system depicted in FIG. 3A cuts LED output significantly by eliminating spectral density above 390 nm. As shown in FIG. 3B, significant light spectrum above 400 nm is eliminated, the resulting LED light source is more focused and less sensitive to changes in LED power level.

Figure 3C:
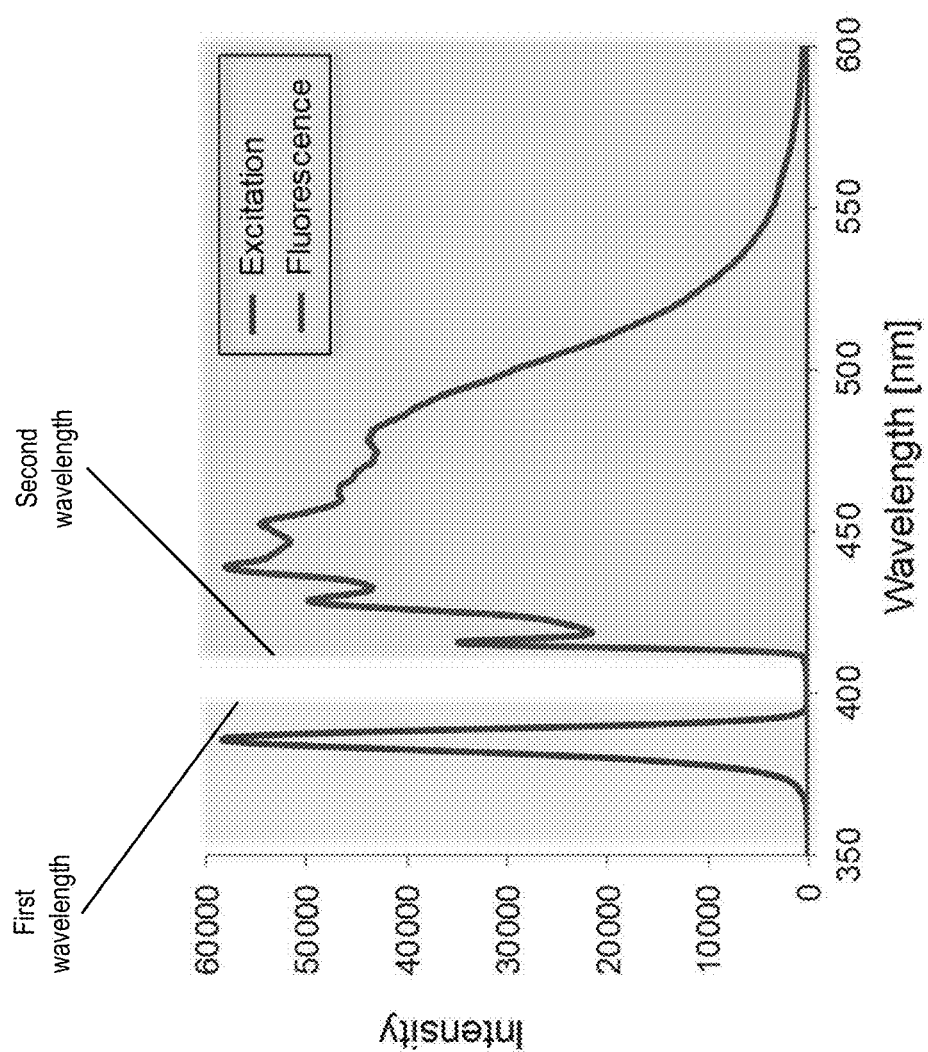
FIG. 3C depicts an exemplary embodiment, illustrating the use of short pass and long pass filters.

FIG. 3C depicts an exemplary embodiment illustrating the use of short pass and long pass filters. The short pass and long pass filters are used to separate the excitation radiation from the resulting fluorescence radiation. As shown, the short pass filter is set at a first wavelength and the long pass filter is set at a second wavelength, where the first wavelength is shorter than the second wavelength. As such, effects of the excitation radiation are separated from those of the resulting fluorescence radiation. In FIG. 3C, the first wavelength is shown around and a little below 400 nm and the second wavelength is shown around 412 nm. One of skill in the art would understand that this pair of wavelengths is not restricted to the values disclosed herein. The wavelengths can be set according to the sample that is being analyzed, in particular based on its absorption and fluorescence characteristics.

Figure 4A:
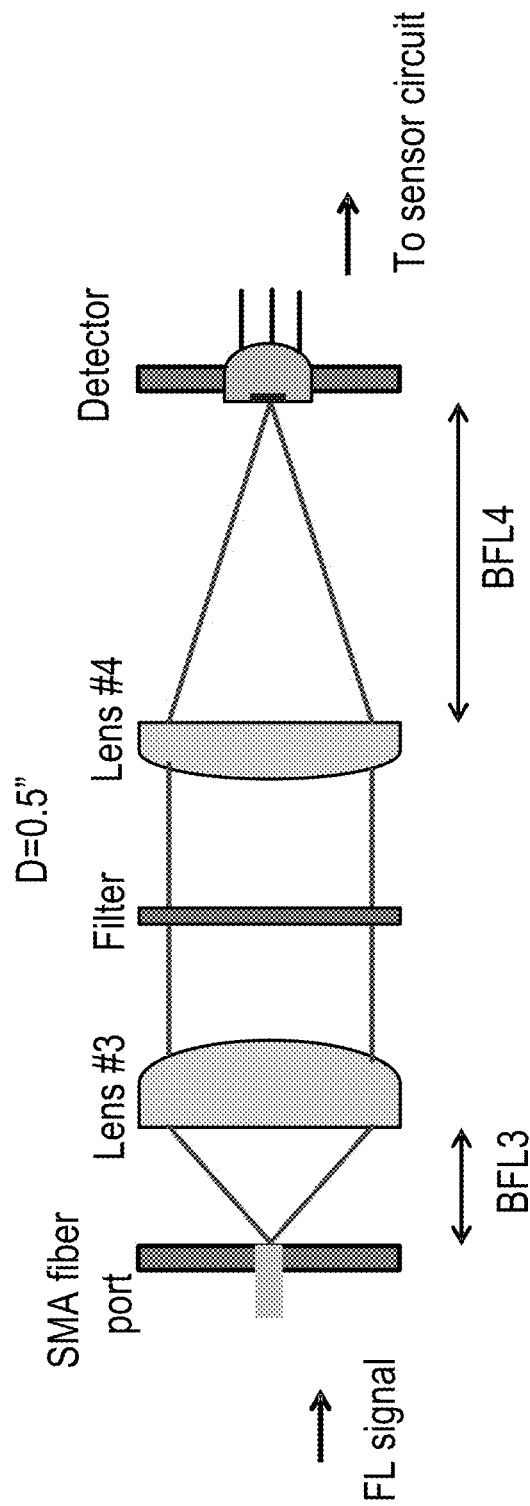
FIG. 4A depicts an exemplary embodiment, illustrating how fluorescence emission is treated prior to being received at a detector.

FIG. 4A illustrates how fluorescence signals emitted from a gemstone can be processed before they are delivered to a detector. For example, signals collected by the fiber probe first reach Lens #3 that is positioned at a third back focal length (BFL3) from the end of the fiber optic probe. Here, the collimated light passes through another filter, a long pass filter. In some embodiments, the long pass filter is configured to pass light having wavelengths above a predetermined wavelength (e.g., 409 nm). In this example, only light with a wavelength longer than 490 nm reaches lens #4, which is positioned at a fourth back focal length (BFL4) from the detector (e.g., spectrometer shown in FIG. 2A). Lens #4 refocuses the filtered fluorescence signals and delivers them to the detector for measurements and/or characterization.

Figure 4B:
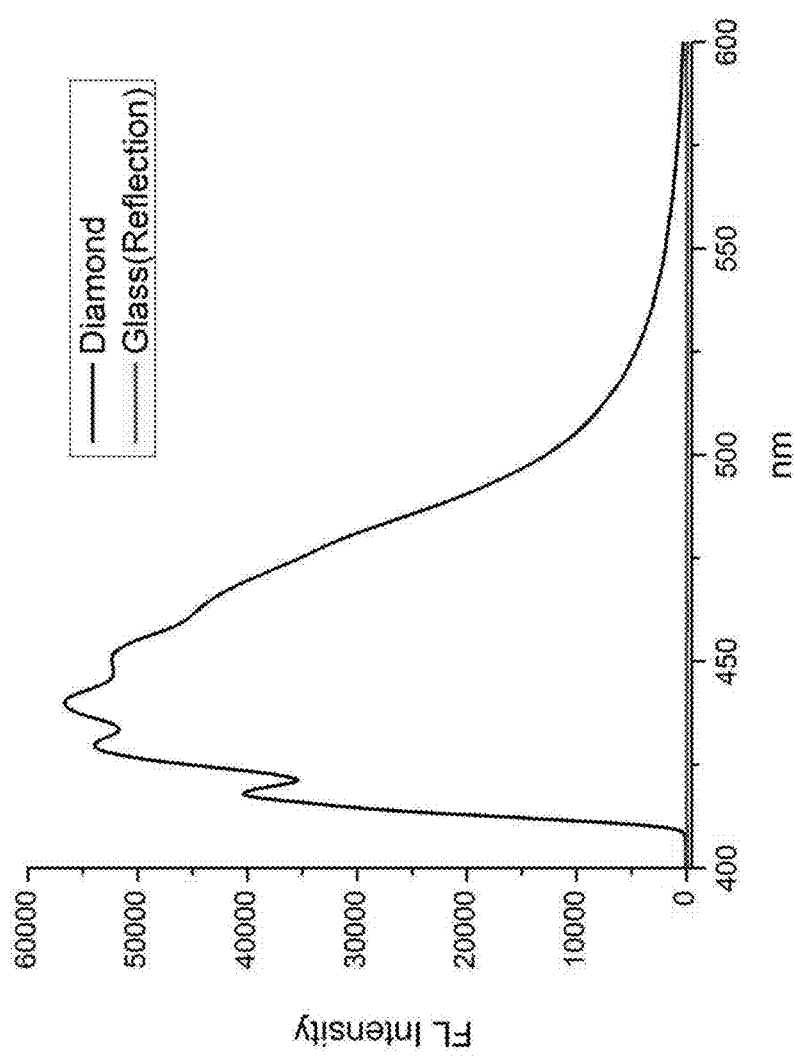
FIG. 4B depicts an exemplary embodiment, showing the effects of treating fluorescence emission before it reaches a fluorescence detector.

FIG. 4B illustrates the effects of fluorescence signals filtering in FIG. 4A. In this particular example, signals below 409 nm or 410 nm are eliminated. As noted above, signals from the LED light source are all below 390 nm, making it impossible for LED light signals to interfere with the measurements and/or characterization of fluorescence signals. Therefore, output from the excitation light source and the input of the fluorescence signals are separate from each other.

In some embodiments, the short pass filter and longer pass filter do not result in light signals with any overlapping wavelength spectrum.

Figure 5A:
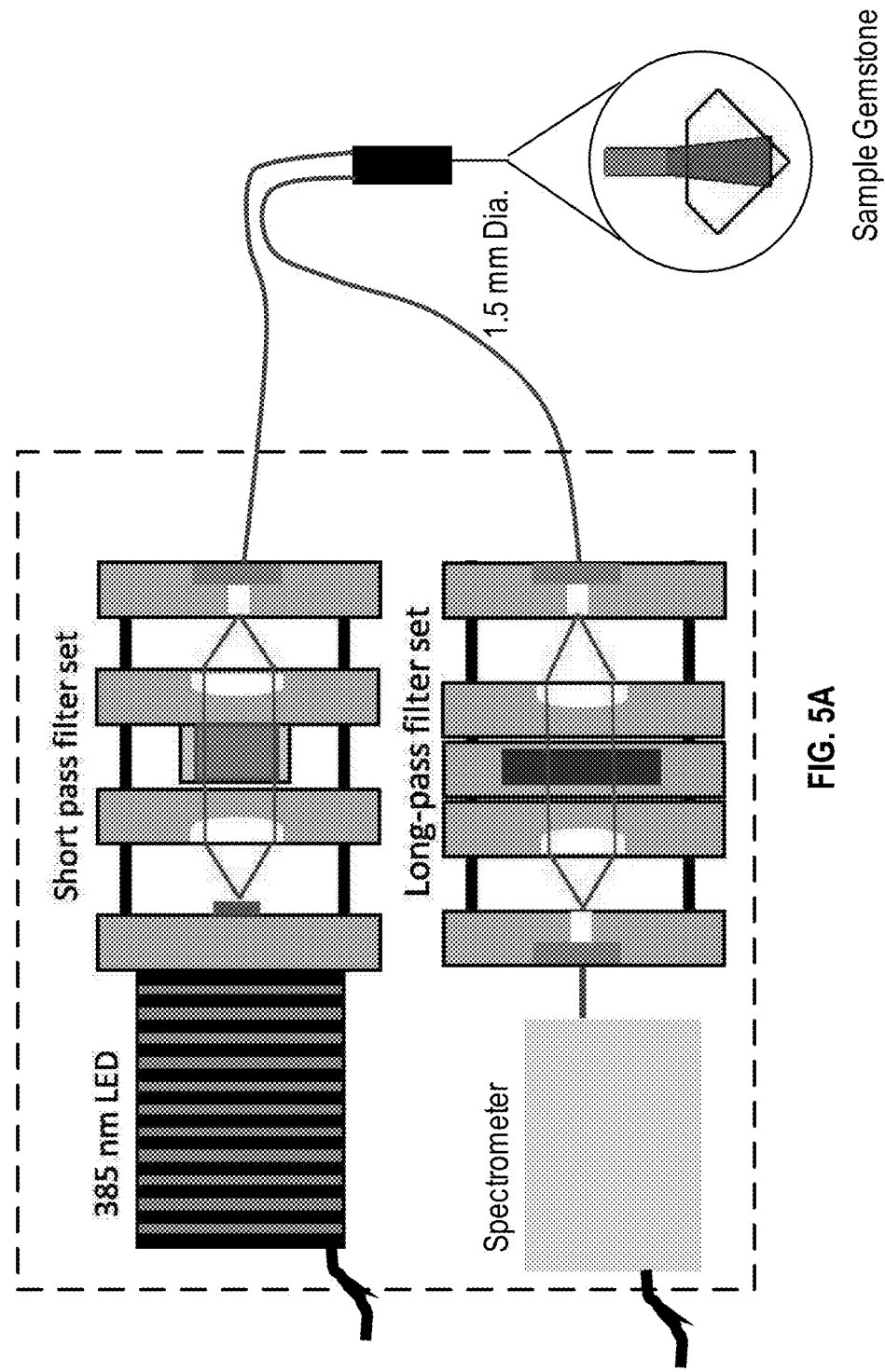
FIG. 5A depicts an exemplary embodiment, showing optical setup for a screening device.

FIG. 5A illustrates a complete device set-up where UV radiation from the light source and fluorescence emission from a sample gemstone (e.g., a diamond) are both modified with filter set. As shown, optical components, including the light source, detector, and various filter sets can be organized with a dashed box. In practice, these components can be assembled in a compartment or box (see; e.g., FIG. 2A), exposing only the fiber optic probe and the cables connecting the probe to the compartment. In some embodiments, the compartment or box is light proof. The only openings on the compartments are the ports for connecting to the power source or the probe.

Optical signals other than diamond's fluorescence may interfere with the testing and reduce the sensitivity. In some embodiments, in order to maximize the sensitivity, it is necessary to keep any material that could generate a fluorescence signal away from the probe while performing the test, such as white paper, human skin, gloves, dust, and oil. For example, many materials can generate detectable fluorescence signals under greater than 1 mW 385 excitation, which might interfere with the screening, e.g., fingers, paper, cloth, plastic, etc. The fluorescence from these materials results in noises that can overlap with the signals from a sample gemstone. In some embodiments, such noises can be filtered out by software algorithm. However, it might reduce the detection sensitivity. In some embodiments, it is recommended these materials be avoided when performing sensing by the device.

In some embodiments, strong light exposure to the sample should be avoided. In some embodiments, the room light should be dimmed if necessary since the system uses a fiber probe that collects optical signal from free space.

Figure 5B:
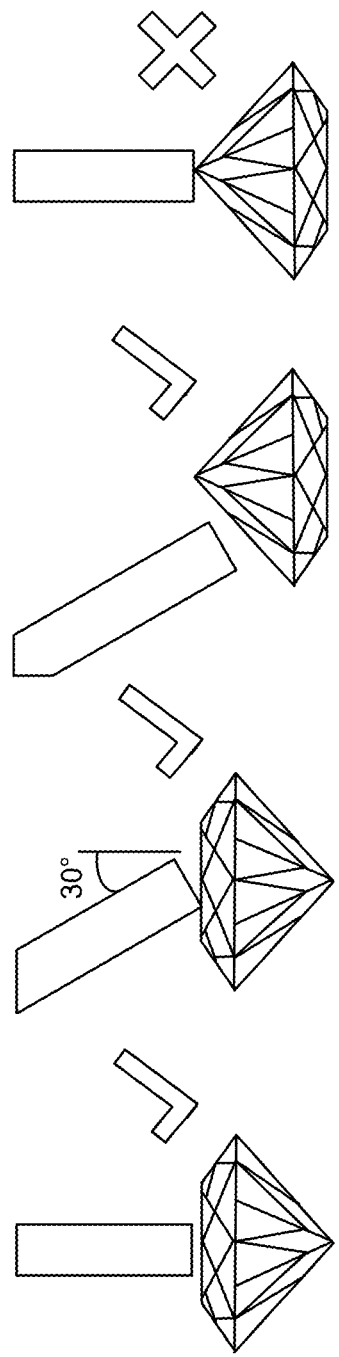
FIG. 5B depicts an exemplary embodiment, illustrating probe positions relative to sample gemstones.

To ensure optimal performance, the stone or jewelry should be cleaned before being tested. A user can then turn on the light source and then gently touch the stone with the fiber probe. In some embodiments, the incident angle of the probe to the surface should be maintained at less than 30°, as indicated in FIG. 5B.

In some embodiments, the device is used to test mounted sample stones. It is recommended to use this device to test samples which are separated (not touching each other) to avoid measuring multiple samples at the same time.

In some embodiments, a sample gemstone such as a diamond is measured from the table's perspective, while the incident angle of the probe to the surface is kept at less than 30°. In some embodiments, a sample gemstone such as a diamond is measured from the pavilion's perspective.

In some embodiments, the device is used to test loose sample stones. In some embodiments, the gemstones have a width that is at least 1 mm or wider for the testing. It is recommended to collect signal from the stone's table to achieve highest sensitivity; however, as long as the signal is strong enough, performing testing from the pavilion or other surfaces is possible. In some embodiments, if the diamond is smaller than 1.5 mm in diameter, a user should avoid performing the testing from the pavilion or culet to prevent damaging the fiber head. In some embodiments, e.g. for loose diamonds, direct touching of the probe head to the tested sample should be avoided.

Figures 6A, 6B:
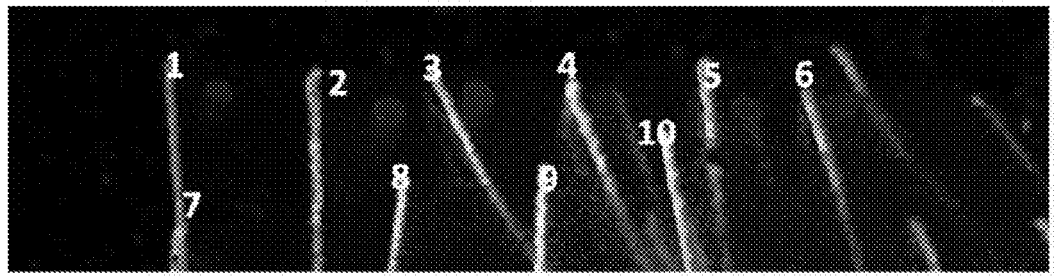
FIG. 6A depicts an exemplary embodiment, showing 10 samples with varied amount of blue fluorescence.
FIG. 6B depicts an exemplary embodiment, showing experimental measurements of the 10 samples with varied amount of blue fluorescence.

FIG. 6A illustrates 10 sample gemstones (diamonds) with varied levels of blue fluorescence, qualified by a fluorescence colorimeter. The table in FIG. 6B lists specific measurements taken for each sample gemstone. Based on the strength of fluorescence emission and the calculated N3/Raman value, sample stones 1-6 are identified as natural. Stones #7 to #10 do not show fluorescence under either LWUV lamp or a fluorescence device and will be referred for further analysis.

FIG. 6C depicts the fluorescence intensity of the same 10 stones, showing that the device is highly sensitive.

Figure 6D:
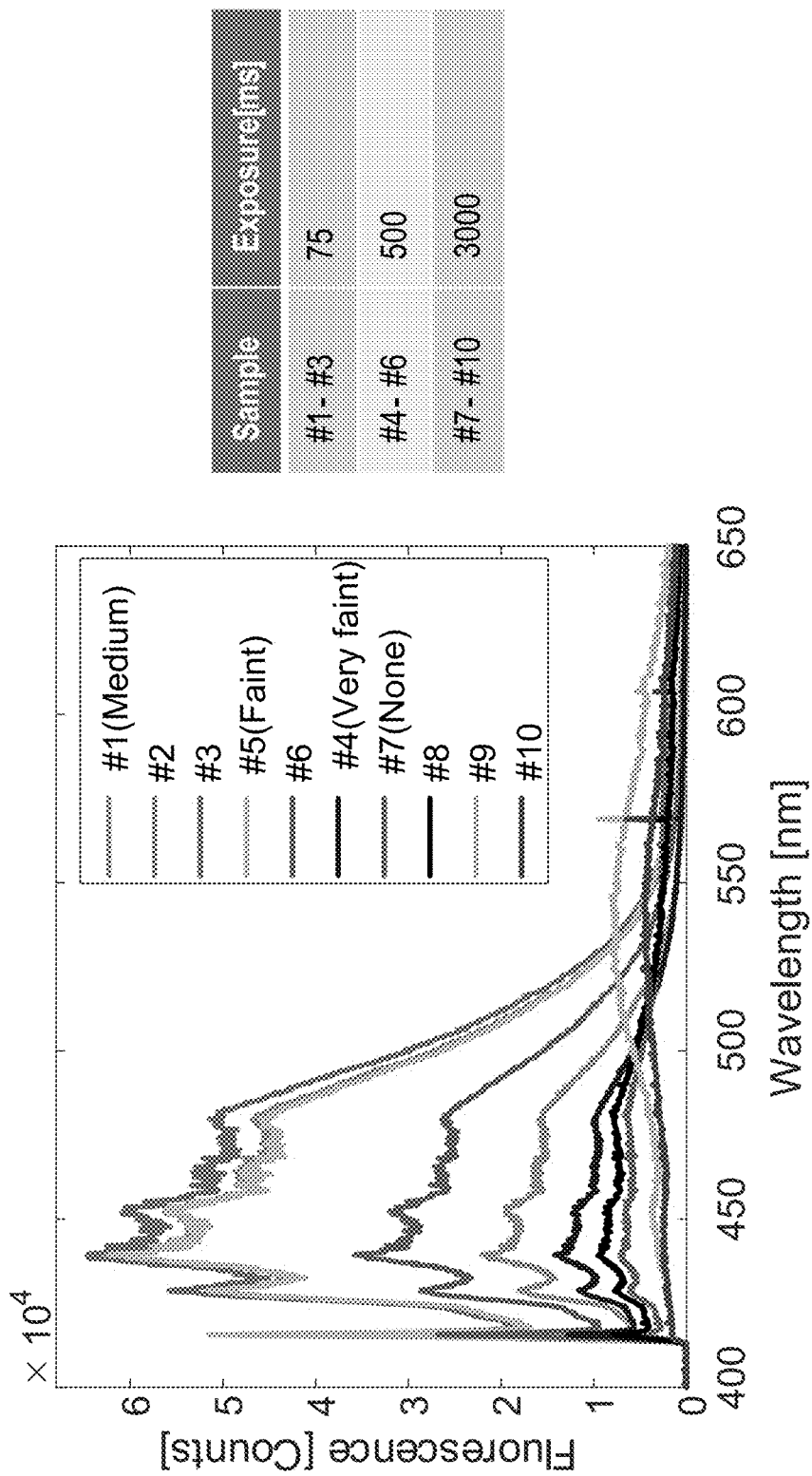
FIG. 6D depicts an exemplary embodiment, showing the effects of prolonged exposure of the 10 samples to varied amounts of blue fluorescence.

In some embodiments, it is possible to improve detection sensitivity by increasing exposure time. FIG. 6D illustrates the effects of prolonged exposure. Here, sample stones #1-6 showed the same fluorescence profile that is consistent with the measurements in FIG. 6B. Additionally, by increasing exposure time to stones #7-10, similar albeit weaker fluorescence profiles were observed for stone #7 and #8. The analysis in FIG. 6D further identifies stones #7 and #8 as natural stones.

Figure 6E:
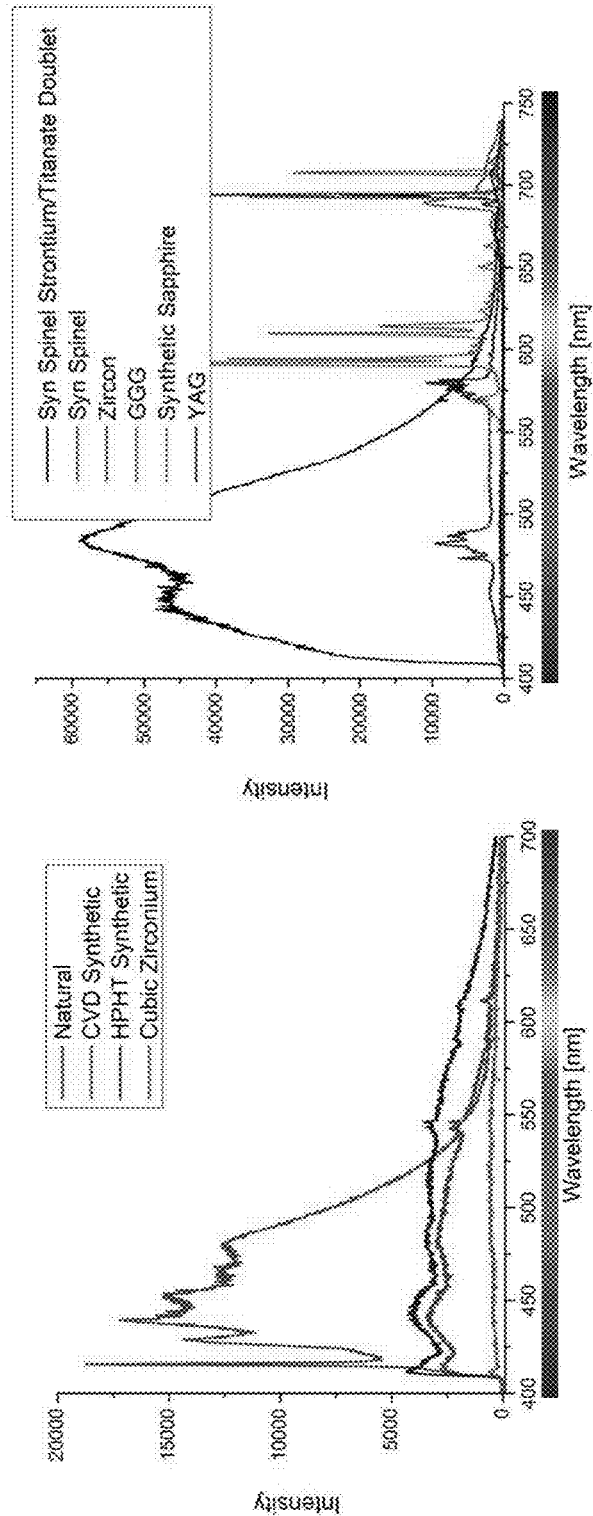
FIG. 6E depicts an exemplary embodiment, illustrating the differences between natural and various synthetic gemstones and diamond simulants.
Figure 6F:
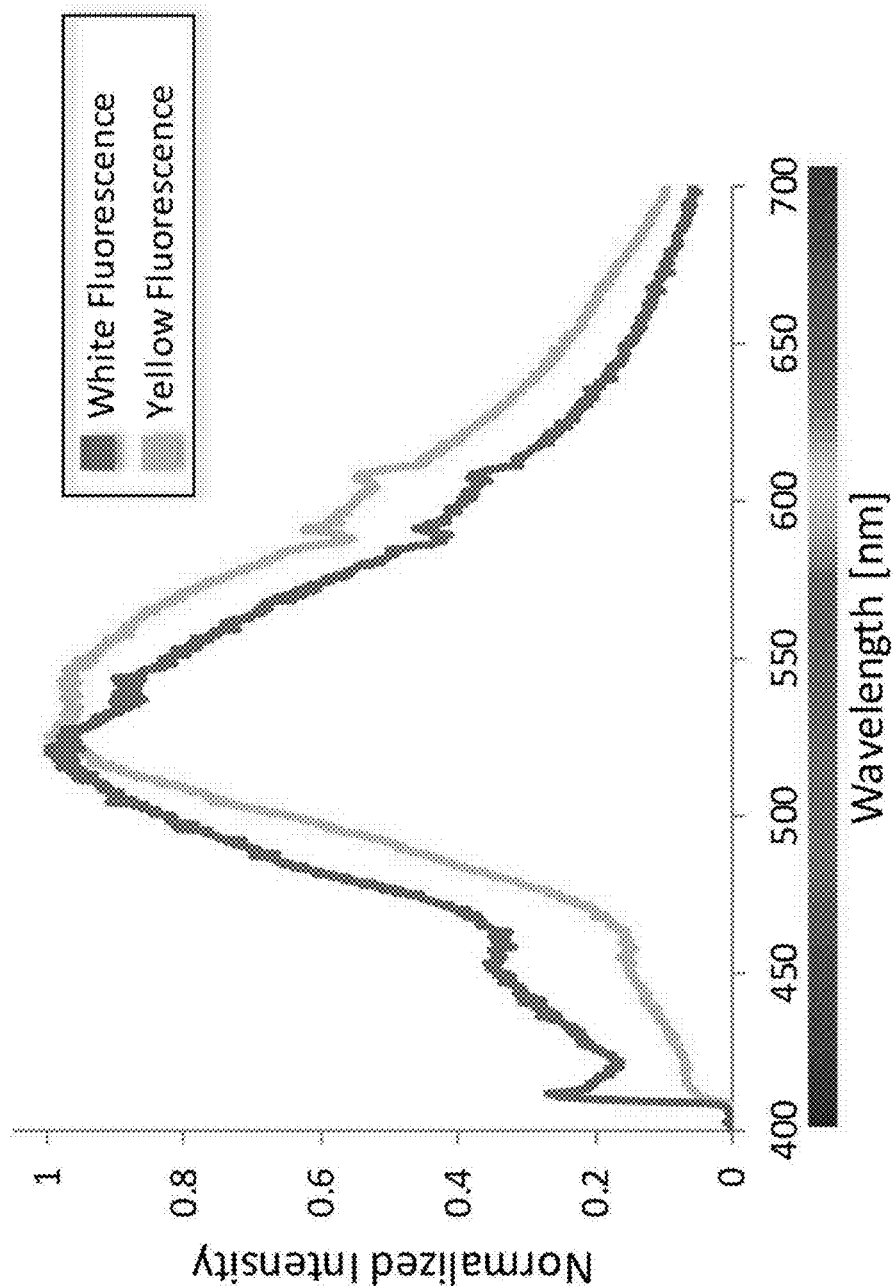
FIG. 6F depicts an exemplary embodiment, illustrating additional types of fluorescence emission in natural gemstones.

Fluorescence detection based on the presence of N3 defects is used as an example when describing the current system and method. It should not limit the scope of the invention in any way. In some embodiments, some natural diamonds show a detectable fluorescence without N3 defects. For example, strong A center diamond shows white fluorescence. Diamonds with 480 nm absorption band show yellow fluorescence. See, for example, FIG. 6E. Hardware and/or software (see below) adjustments can be used to achieve detection of such fluorescence and identify natural gemstones (such as diamonds). And based on these fluorescence patterns, the analysis in FIG. 6E further identifies stones #9 and #10 as natural stones.

As disclosed herein, $N_3$ defects and the corresponding fluorescence can be used to detect natural diamonds. In some embodiments, a diamond may not have enough $N_3$ defects to result in data that are sufficient for detection or may have other defects that can quench the $N_3$ fluorescence signals. In some embodiments, other fluorescence data, including but not limited to green, white, green, or yellow fluorescence, can be used to facilitate natural diamond detection. In some embodiments, the additional fluorescence data can be used in addition to the $N_3$ fluorescence data.

In some embodiments, the different levels or type of analysis illustrated in FIGS. 6A through 6F can be combined as sequential steps in one round of optical/fluorescence analysis. Such combination can be achieved through software integration. For example, optical analysis can start with detection of the most commonly present marker or defects for natural stones, followed by methods for detecting markers or defects that are relatively rare. For example, in the example shown in FIGS. 6A-6F, N3 defects are more commonly present and can be used to detect most of the natural stones (stones #1 through #8) by simple variation of exposure time. Yellow fluorescence is relatively rare but can be detected in stones #9 and #10.

Figure 7A:
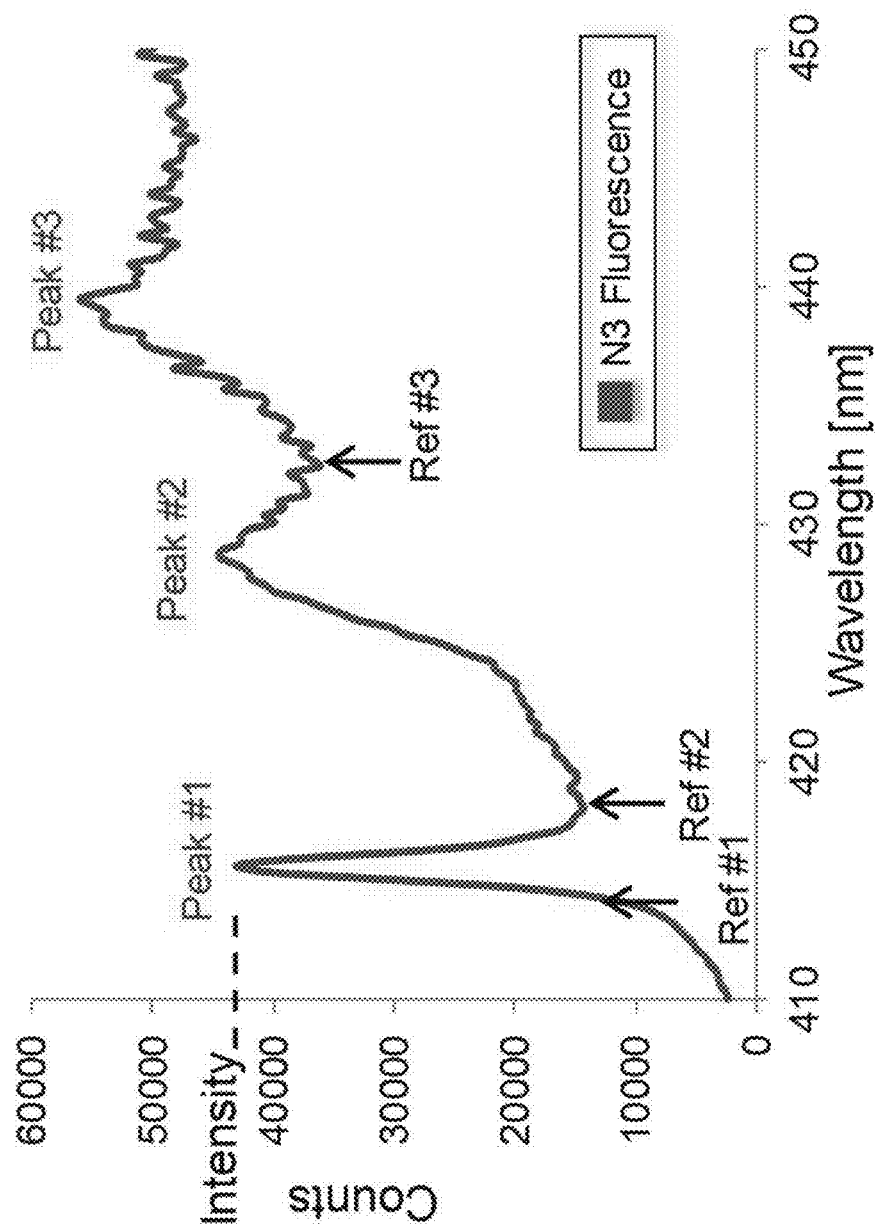
FIG. 7A depicts an exemplary embodiment, showing a sample spectrum based on N3 fluorescence in a natural diamond.
Figure 7B:
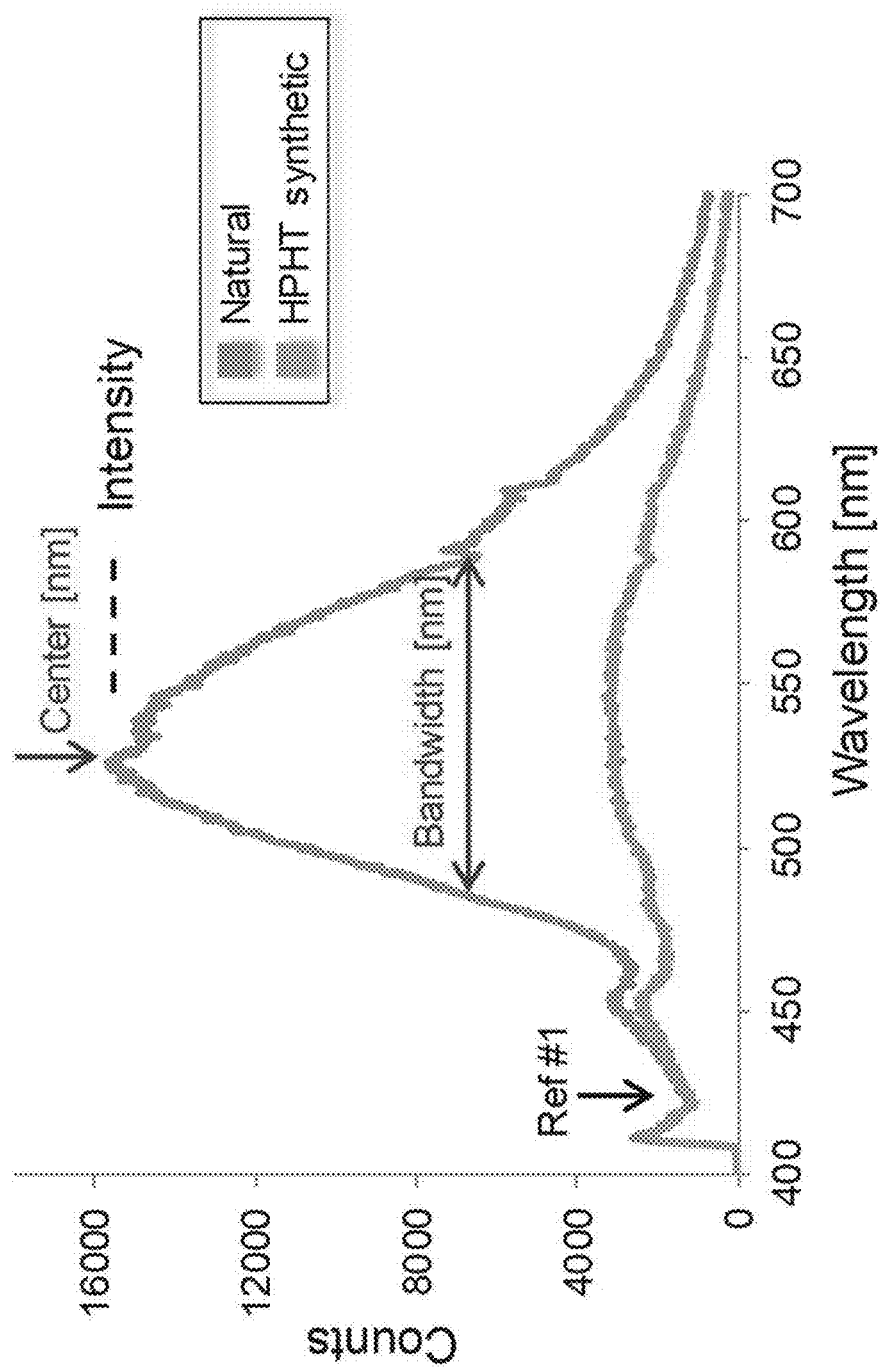
FIG. 7B depicts an exemplary embodiment, comparing the white fluorescence level of a natural diamond with that of a HTHT synthetic diamond.
Figure 8:
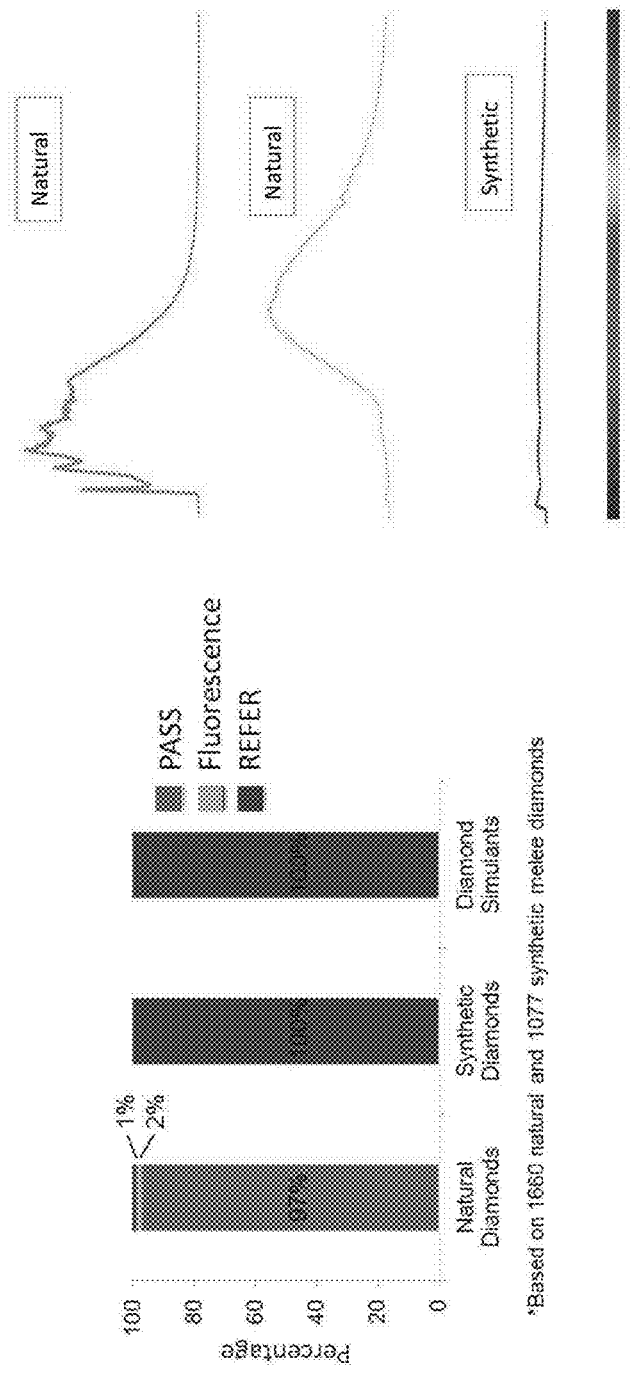
FIG. 8 depicts an exemplary embodiment, showing results of analysis of colorless diamonds.

In some embodiments, the methods and systems disclosed herein are used to identify natural colorless diamonds of the D-to-Z grading range (see, e.g., FIGS. 7 and 8). In some embodiments, the methods and systems disclosed herein can be used to detect treated pink diamonds (see, e.g., FIG. 9).

In some embodiments, the methods and systems disclosed herein are used to identify natural color diamonds. Exemplary color gemstones include but are not limited to ruby, sapphire, corundum, topaz, emerald, spinel, garnet, and zoisite and etc. Luminance spectra of colored stones of natural origins revealed distinct light emission patterns (see, e.g., FIG. 10).

As disclosed herein, characteristic fluorescence from gemstones can be used to identify the type of minerals embedded in the sample stones, thereby identifying diamond, corundum (ruby, sapphire), spinel, emerald, zoisite (tanzanite), and some topaz and garnets.

In some embodiments, one or more libraries can be established for luminance spectra of different types of gemstones, from colorless to near-colorless diamonds, pink diamonds, and to ruby, sapphire, corundum, topaz, emerald, spinel, garnet, zoisite and others. In some embodiments, a collection of luminance signature curves can be established for each type of gemstone.

In one aspect, disclosed herein is a software platform for operating and controlling gemstone screening.

Consistent with the analysis disclosed herein, a software platform for the current system and method can include a user interface for carrying out two important types of functions: calibration and sample analysis.

In some embodiments, a calibration can include ambient light calibration. Ambient light calibration is required every time when the user is starting the software. The ambient light spectrum depends on the background spectrum of the workstation. It is recommended to run this function after any potential background spectrum change, before using the software, to maintain the sensitivity.

In some embodiments, a calibration can also include dark calibration. In some embodiments, the dark calibration can be optional. For example, when dark calibration data is not available, e.g., when the data is lost or when first use of a new sensor is used for the first time, the software interface will ask a user to perform a dark calibration. In some embodiments, during the dark calibration, the fiber optic probe is removed, and the empty ports for connecting the probe can be covered by connector caps.

In some embodiments, the system can be set to perform calibrations periodically. In some embodiments, the system can be set to perform calibrations automatically each time the system restarts.

When performing sample analysis, the system can include a pre-set exposure time for collecting fluorescent data for a particular sample. In some embodiments, the system can automatically adjust the exposure time depending on the signals collected during a particular data collection round.

In some embodiments, when data indicate ambiguous results, the system can present an option to the user to repeat the analysis for the particular sample.

In some embodiments, when the interested fluorescence signature is near the main features of ambient light (between 450 to 650 nm), a calibration process is being triggered that comprises collecting an ambient light spectrum under conditions similar to those of an actual measurement process. The ambient light spectrum is collected by moving the probe close to the sample while the UV source is off.

In some embodiments, after the ambient light spectrum is collected, both the ambient light spectrum and the measured spectrum are normalized into a 0-to-1 scale and the scaling factor is recorded. In some embodiments, the position of the peak or the local maximum in the ambient spectrum is identified and used as a check point.

In a sample ambient light calibration process, a weight is assigned to the normalized ambient spectrum. In some embodiments, the weight starts with 0. In some embodiments, the weight starts with 0.1, 0.2, 0.3, and etc. A measurement spectrum is also collected of a sample gemstone while the UV light source is turned on. The measurement spectrum can be normalized. Subsequently, the weighted ambient spectrum is subtracted from normalized measured spectrum. Next, the smoothness of the spectrum curve is checked around the check point previously identified. If the smoothness meets the requirement, a calibrated measurement spectrum is returned. If the smoothness does not meet the requirement, the weight of the normalized ambient spectrum can be adjusted by 0.05. As disclosed herein, the adjustment can be either an increase or a decrease. The smoothness-fitting step can be an iterative process. The weight adjustment can be automatically generated according to pre-set standards or manually entered by a user. In some embodiments, a fitting mechanism can be applied to extract an optimize weight.

After the fitting step, the calibrated measurement spectrum can be scaled back to its original scale and used in further analysis.

As disclosed herein, if the ambient light is provided by one or more fluorescent lamps, calibration is mandatory because peaks from a fluorescent lamp can overwhelm diamond's fluorescence spectrum.

EXAMPLES

The following non-limiting examples are provided to further illustrate embodiments of the invention disclosed herein. It should be appreciated by those of skill in the art that the techniques disclosed in the examples that follow represent approaches that have been found to function well in the practice of the invention, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the invention.

Example 1

Exemplary $N_3$ Analysis

FIG. 7A shows an exemplary N3 fluorescence spectrum of a natural diamond. Here, three peaks are identified between 410 nm and 450 nm. Selected data were extracted from each peak to calculate characteristics that would be representative of the peak.

For example, for each of the three peaks shown in FIG. 7A, a peak intensity value and a reference intensity value were determined. A peak to reference ratio was then calculated. In the example shown in FIG. 7A, the peak intensity at 415.6 nm was most representative. N3 has a zero phonon line at 415.6 nm at room temperature and the analysis disclosed herein is to confirm this peak and its relative side peaks. This ratio analysis is just one of many ways to achieve peak analysis. In some embodiments, the peak at 415.6 nm is used because this peak position is very stable at room temperature.

As disclosed herein, multiple spectra can be collected to determine multiple peaks and their corresponding peak to reference ratios. One or more peaks can be selected for further processing based on peak ratios. It is not necessary to use all peaks in subsequent analysis.

FIG. 7B shows an example of characterizing a fluorescence band. The quality of a fluorescence band was assessed based on a number of parameters, including the center intensity value, the bandwidth in nm, and a reference intensity value. In this example, the reference intensity value was determined based on the fluorescence spectrum of an HPHT synthetic diamond, which served as a negative control. As illustrated, it is still possible to use the center and the bandwidth to identify this type of fluorescence spectrum coming from a natural diamond. In contrast, HPHT synthetic diamonds do not show a strong fluorescence band.

Example 2

Colorless Diamond Analysis

FIG. 8 illustrates analytic results of colorless diamonds. The current method (using $N_3$ analysis) could correctly identify 97% of the natural diamonds among 1660 natural diamonds and 1077 synthetic melee diamonds that were tested.

An additional 2% of the natural diamonds were further identified based on their fluorescence spectra; for example, based on the center bandwidth of the fluorescence spectra (e.g., FIG. 7B). Synthetic diamonds and diamond simulants can be detected with 100% accuracy.

In FIG. 8, on the right, emission or luminance curves of natural origin diamonds are compared with that of a typical synthetic diamond. The curves depict fluorescence emission in the visible range from slightly over 400 nm (at determined by the long pass filter) to about 750 nm), covering the color spectrum from violet to red. As depicted, upon exposure to a UV light source, a synthetic diamond shows no observable emission in the detection range. Diamonds of natural origin on the other hand show significant light emission. In some embodiments, some natural diamonds have no detectable $N_3$ spectrum.

Example 3

Pink Diamond Analysis

Figure 9:
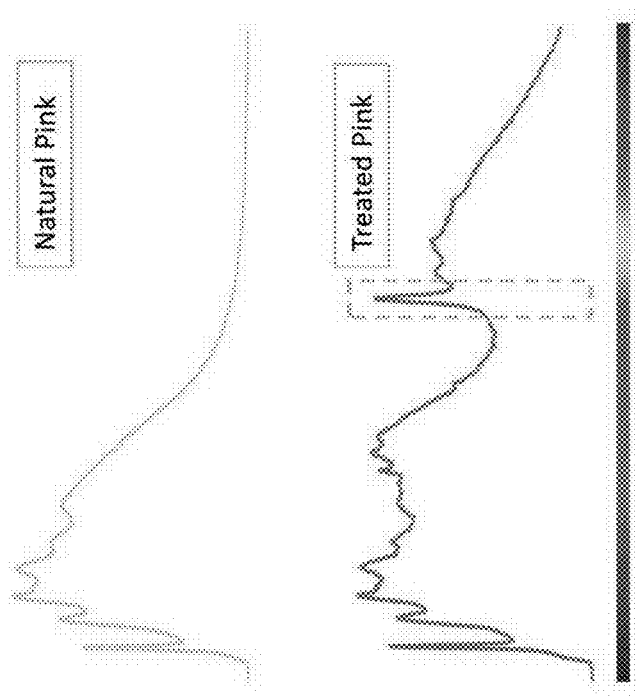
FIG. 9 depicts an exemplary embodiment, illustrating the differences between natural and treated pink diamonds.

Different types of treatments, for example, high temperature high pressure (HPHT), irradiation and/or annealing, have been used to enhance the color appearance of pink diamond. However, after the process, it also amplifies or introduces some features which are very rare to be found in natural, un-treated pink diamonds. FIG. 9 illustrates analytic results of pink diamonds by comparing the spectroscopic features of a natural pink diamond and a treated pink diamond. In this example, characteristic fluorescence can be used to identify pink colored diamond that has been treated through temperature or pressure processing. The top spectrum is the fluorescence curve of a natural pink diamond while the bottom curve shows the fluorescence spectrum of a treated pink diamond. Noticeably, a natural pink diamond showed no significant emission after 540 nm (in particular after 560 nm or 580 nm).

A treated pink diamond exhibited considerable emission between 540 nm and 660 nm. In particular, a distinct fluorescence peak in the orange color range was observed for a treated pink diamond between 560 nm and 580 nm, which can be used as a signature reference for identify treated pink diamonds. On one hand, treated (color enhanced) pink diamonds showed the following features which are rare in natural pink diamonds: peak at 504 (H3), peak at 575 $(N-V)^0$, and peak at 637 $(N-V)^-$. On the other hand, the vast majority of natural, untreated pink diamonds do not have a clear 575 nm peak. These peaks can be used alone or in combination to identify the treatment. These features are generated during the color enhancement process.

Example 4

Additional Types of Gemstones

Many minerals are colored by impurity of metal ions. Besides changing the appearance of those minerals and gemstones, some of the metal ions could also contribute to fluorescence. For example, chromium is an important cause of red fluorescence in many minerals. Based on fluorescence spectroscopy, the luminance spectrum of these gem stones could be used to identify their corresponding mineral type.

Figure 10:
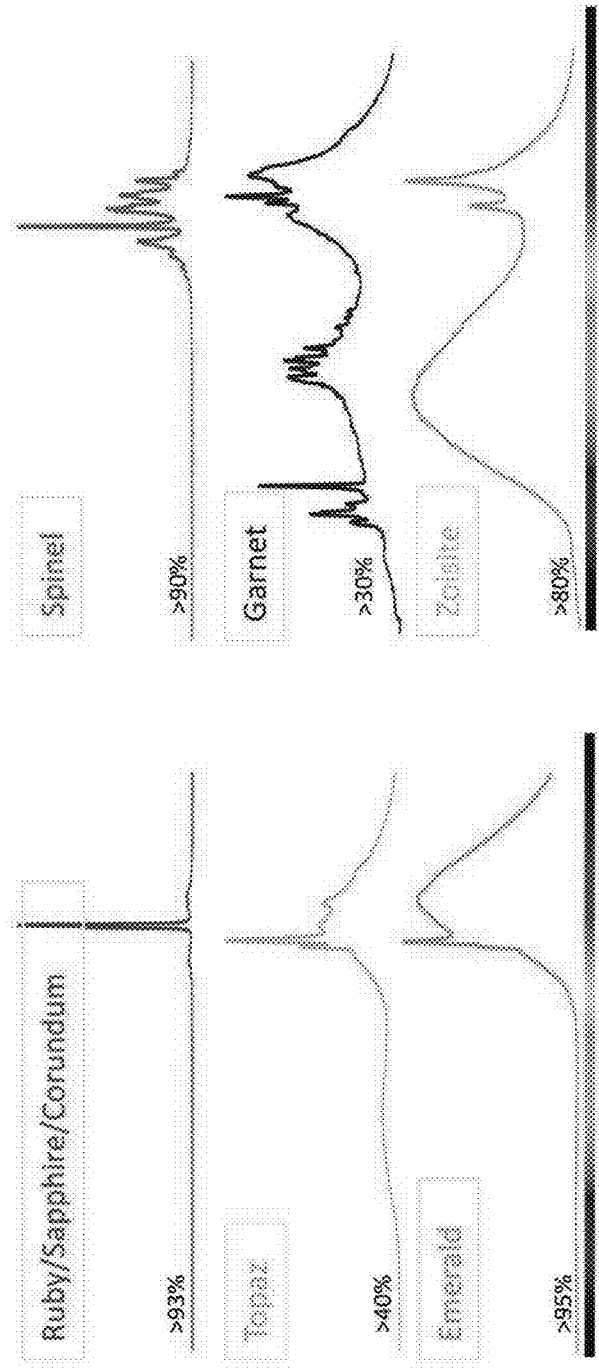
FIG. 10 depicts an exemplary embodiment, showing results of analysis of different colored gemstones.

FIG. 10 illustrates analytic results of gemstones of different colors, showing the luminance features of 6 types of colored stones which cover a significant breadth of the colored stones available. In this example, the methods and systems disclosed herein are used to identify the mineral type of different colored gem stones. Exemplary colored gem stones include but are not limited to ruby, sapphire, corundum, topaz, emerald, spinel, garnet, and zoisite and etc. Luminance spectrum of colored stones of natural origins revealed distinct light emission patterns.

For example, chromium is the main trace element which contributes to the red fluorescence in these minerals. Excited by near violet light, over 90% of the corundum and spinel, over 95% of the emerald, and over 80% of the zoisite generates distinct red fluorescence features. In addition, some of the topaz and garnet could also generate recognizable spectra. By using the peak position and bandwidth, we created a gemstone identification algorithm, which can rapidly identify the corresponding mineral type.

Example 5

Sample User Interfaces

FIGS. 11A-11F illustrate sample screenshots from a sample software program that operates and controls the gemstone screening device.

Figure 11A:
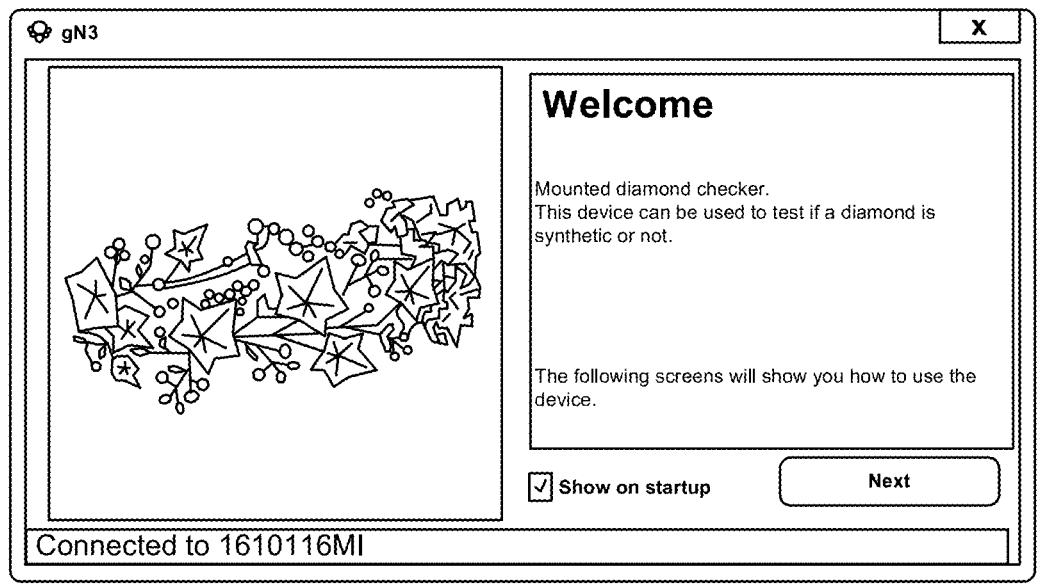
FIG. 11A depicts an exemplary embodiment, showing a screenshot of the software program for operating the screening device.

A user can launch the program by double-clicking the shortcut icon depicted in FIG. 11A. The welcome page shown in FIG. 11A displays the program's serial number. At this step, the software can detect the presence of an optical sensor. If no sensor is detected, a user can be advised to close the software and check the USB connection.

Figure 11B:
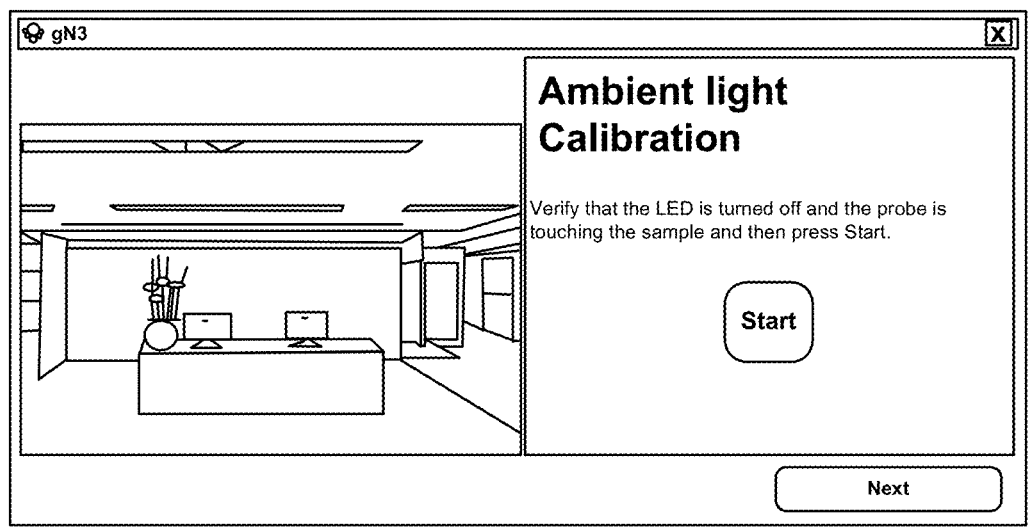
FIG. 11B depicts an exemplary embodiment, showing a screenshot of the software program for operating the screening device.
Figure 11C:
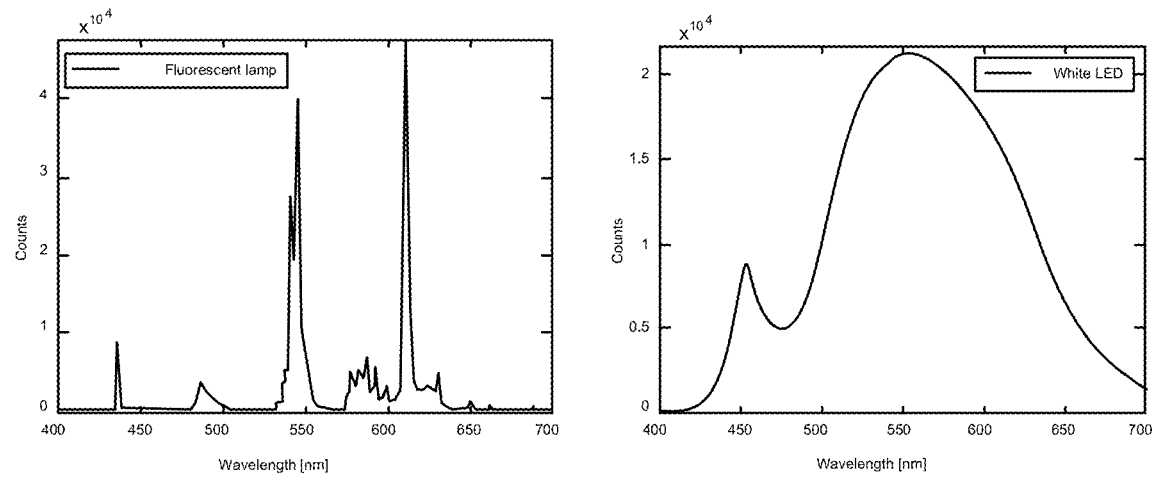
FIG. 11C depicts an exemplary embodiment, showing exemplary spectra from commonly used light sources.
Figure 11D:
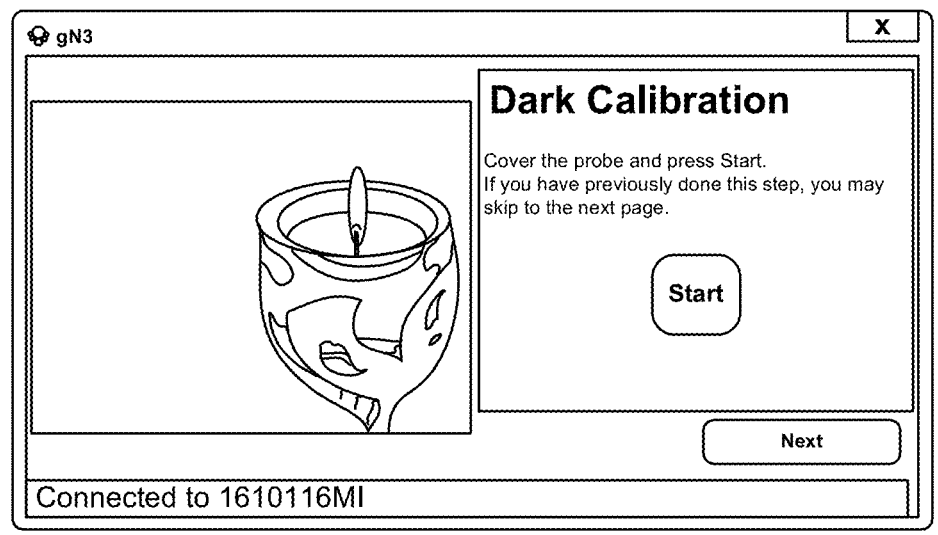
FIG. 11D depicts an exemplary embodiment, showing a screenshot of the software program for operating the screening device.

It is possible to perform ambient light calibration by selecting the ambient light calibration function start menu shown in FIG. 11B. Before calibration can proceed, the LED light source needs to be turned. A user should gently touch the sample (diamond) with the fiber probe and then click "start". Typical spectra of common light sources are included in FIG. 11C.

By clicking the start icon on the dark calibration menu (e.g., see FIG. 11D), the software will automatically calibrate dark signals. Dark calibration serves as a negative control, representing a start with no measurements. Upon completion, a user can click a "Next" icon to finish dark calibration.

After calibration, a user can switch on the LED light source and proceed with gemstone testing, as shown in FIG. 8E. A user can gently touch the fiber probe to the sample gemstone (e.g., a diamond). The identification result can be presented both by the figure and the voice. The software can run in continuous mode until the user presses "Stop testing". In some embodiments, the green check mark represents "PASS"; and the yellow question mark represents "REFER," as shown in the following table.

| Result | Description |
|--------|-------------|
| PASS | The tested sample has detected diamond's characteristic luminescence patterns, indicating that this is a natural diamond |
| REFER | The tested sample has not detected characteristic luminescence patterns, indicating that this could be a synthetic diamond, treated diamond, or non-diamond |

Note:
Among natural diamonds, about 1% of stones will be "referred" by this device for further testing.

Figure 11E:
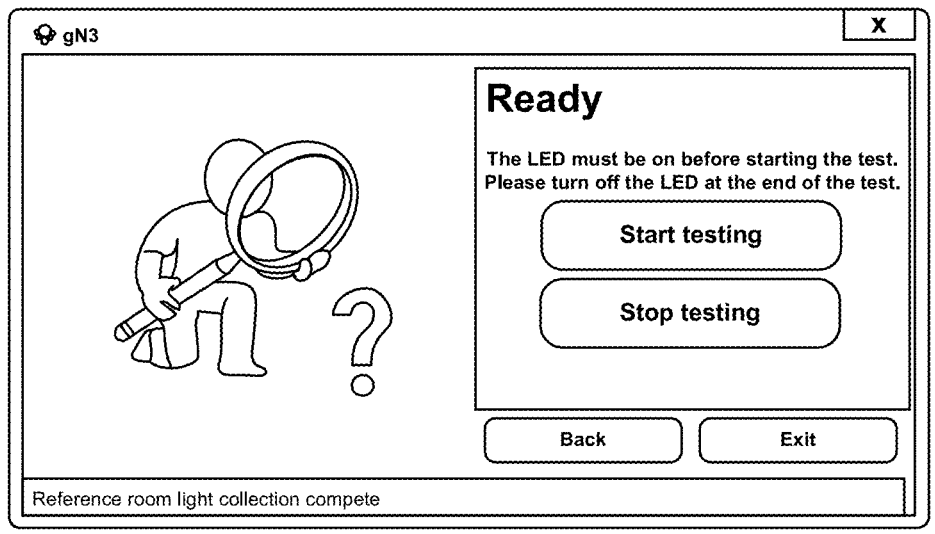
FIG. 11E depicts an exemplary embodiment, showing a screenshot of the software program for operating the screening device.
Figure 11F:
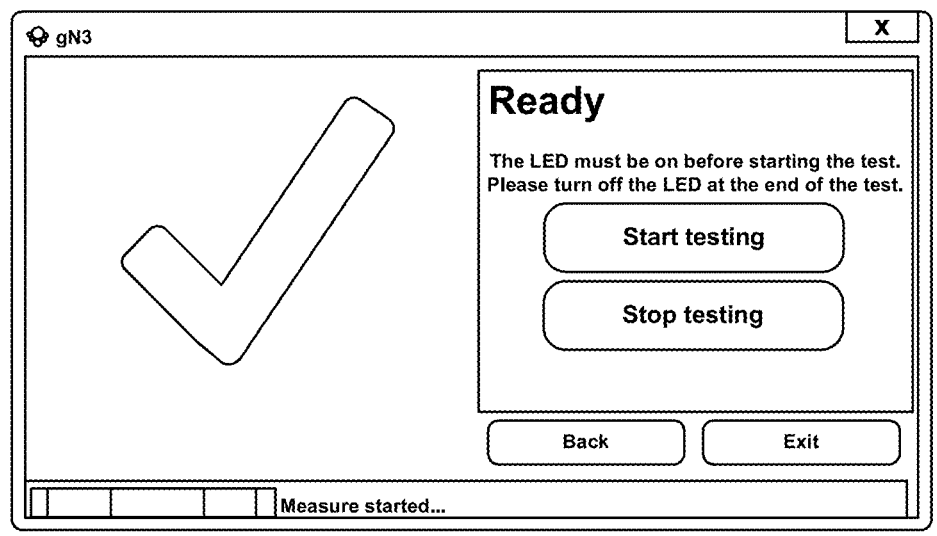
FIG. 11F depicts an exemplary embodiment, showing a screenshot of the software program for operating the screening device.

At either interface depicted in FIG. 11E or FIG. 11F, a user can choose to end testing by clicking on the "stop testing" choice.

Figure 12A:
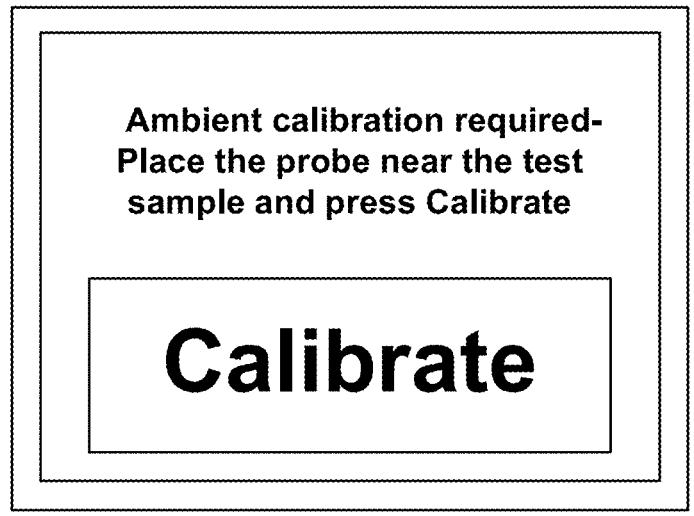
FIG. 12A depicts an exemplary embodiment, showing a screenshot of the software program for operating the screening device.
Figure 12B:
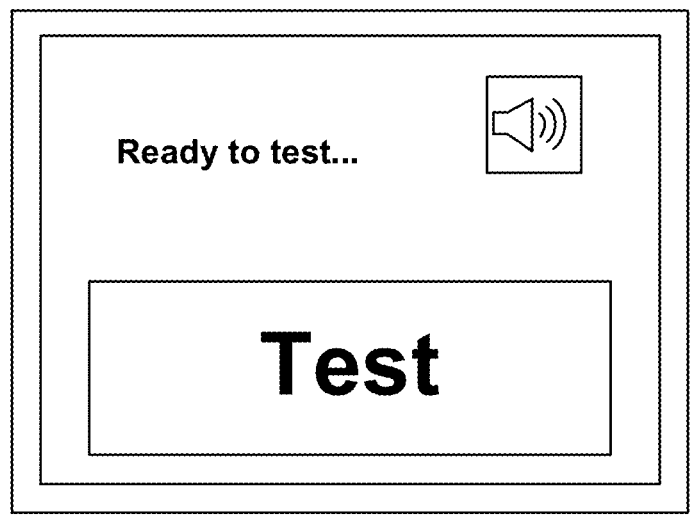
FIG. 12B depicts an exemplary embodiment, showing a screenshot of the software program for operating the screening device.
Figure 12C:
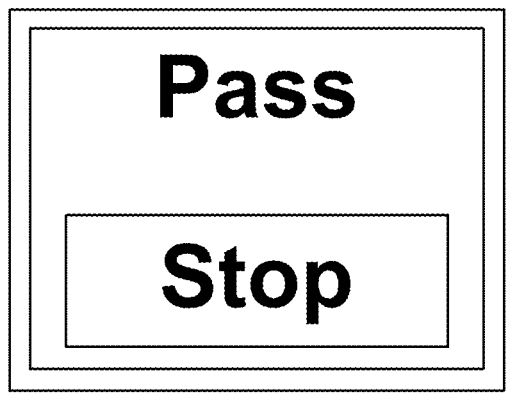
FIG. 12C depicts an exemplary embodiment, showing a screenshot of the software program for operating the screening device.
Figure 12D:
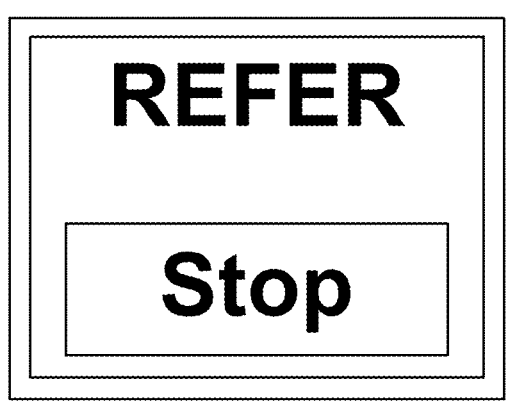
FIG. 12D depicts an exemplary embodiment, showing a screenshot of the software program for operating the screening device.
Figure 12E:
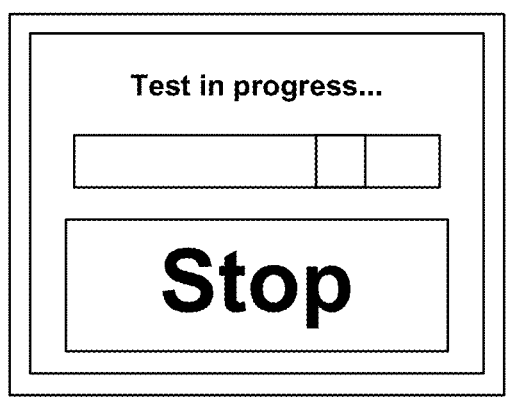
FIG. 12E depicts an exemplary embodiment, showing a screenshot of the software program for operating the screening device.

FIGS. 12A through 12E illustrate another exemplary user interface. The sample screenshots were from another sample software program that operates and controls a gemstone screening device with a built-in microcomputer (e.g., FIGS. 1F and 1G). Here, a touch screen is used. Menu options for performing particular tasks are presented as buttons on the touch screen. Instead of pushing a physical button on the device, a user can now touch an option on the touch screen (e.g., a calibration button in FIG. 12A and a test button in FIG. 12B). FIGS. 12C-12E show that analysis can be stopped at any stage; for example, after a pass or refer result is returned (e.g., FIGS. 12C and 12D) or during the analysis (e.g., FIG. 12E).

The user interface illustrated in FIGS. 12A through 12E is simple, which can enable a simple and compact apparatus design.

Having described the invention in detail, it will be apparent that modifications, variations, and equivalent embodiments are possible without departing from the scope of the invention defined in the appended claims. Furthermore, it should be appreciated that all examples in the present disclosure are provided as non-limiting examples.

The various methods and techniques described above provide a number of ways to carry out the invention. Of course, it is to be understood that not necessarily all objectives or advantages described may be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as may be taught or suggested herein. A variety of advantageous and disadvantageous alternatives are mentioned herein. It is to be understood that some preferred embodiments specifically include one, another, or several advantageous features, while others specifically exclude one, another, or several disadvantageous features, while still others specifically mitigate a present disadvantageous feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be mixed and matched by one of ordinary skill in this art to perform methods in accordance with principles described herein. Among the various elements, features, and steps, some will be specifically included and others specifically excluded in diverse embodiments.

Although the invention has been disclosed in the context of certain embodiments and examples, it will be understood by those skilled in the art that the embodiments of the invention extend beyond the specifically disclosed embodiments to other alternative embodiments and/or uses and modifications and equivalents thereof.

Many variations and alternative elements have been disclosed in embodiments of the present invention. Still, further variations and alternate elements will be apparent to one of skill in the art.

In some embodiments, the numbers expressing quantities of ingredients, properties such as molecular weight, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

In some embodiments, the terms "a" and "an" and "the" and similar references used in the context of describing a particular embodiment of the invention (especially in the context of certain of the following claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Preferred embodiments of this invention are described herein. Variations on those preferred embodiments will become apparent to those of ordinary skill in the art upon reading the foregoing description. It is contemplated that skilled artisans can employ such variations as appropriate, and the invention can be practiced otherwise than specifically described herein. Accordingly, many embodiments of this invention include all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Furthermore, numerous references have been made to patents and printed publications throughout this specification. Each of the above-cited references and printed publications are herein individually incorporated by reference in their entirety.

In closing, it is to be understood that the embodiments of the invention disclosed herein are illustrative of the principles of the present invention. Other modifications that can be employed can be within the scope of the invention. Thus, by way of example, but not of limitation, alternative configurations of the present invention can be utilized in accordance with the teachings herein. Accordingly, embodiments of the present invention are not limited to that precisely as shown and described.

We claim:

1. A screening device for gemstones, comprising:
   an LED light source for providing radiation to a gemstone at or near a pre-set excitation wavelength, wherein the LED light source is coupled with a first lens configured to collimate light from the LED light source, the first lens coupled with a short pass filter that substantially passes radiation below a first predetermined wavelength and the short pass filter coupled to a second lens, the second lens configured to collect light to send through a fiber optic probe, and wherein the first predetermined wavelength is longer than the excitation wavelength;
   a fluorescence detector including a first fluorescence lens coupled to a long pass filter, the long pass filter coupled to a second fluorescence lens wherein the long pass filter substantially passes radiation above a second predetermined wavelength, the fluorescence detector including an optical slit 100 microns or less, wherein the fluorescence detector second fluorescence lens is placed at a distance which is fourth back focal length from the detector, wherein only radiation above the second predetermined wavelength is received at the fluorescence detector, wherein the second predetermined wavelength is longer than the first predetermined wavelength;
   wherein the fiber optic probe is coupled to both the second lens of the LED light source and the fluorescence detector first fluorescence lens, wherein the fiber optic probe is configured to deliver the radiation from the LED light source to the gemstone and to receive fluorescence emitted from the gemstone and send it to the fluorescence detector;
   a sensor circuit in communication with the fluorescence detector, configured to receive data from the fluorescence detector.

2. The screening device for gemstones of claim 1, wherein the pre-set excitation wavelength is 405 nm or shorter.

3. The screening device for gemstones of claim 1, wherein the pre-set excitation wavelength is 385 nm.

4. The screening device for gemstones of claim 1, wherein the LED light source is coupled to a heat sink or coupled with a band pass filter.

5. The screening device for gemstones of claim 1, wherein the first predetermined wavelength is between 360 nm to 405 nm.

6. The screening device for gemstones of claim 1, wherein the second predetermined wavelength is between 405 nm to 413 nm.

7. The screening device for gemstones of claim 1, wherein the fiber optic probe is connected to an optical cable comprising two or more optical fibers.

8. The screening device for gemstones of claim 1, wherein the optical cable connected to the fiber optic probe is split into at least two optical cables comprising a first optical cable connected to the LED light source and a second optical cable connected to the fluorescence detector.

9. A method for screening a gemstone based on its fluorescence emission, comprising:
   by a computing device with a processor and a memory, wherein the computing device is in communication with a fluorescence detector, receiving data regarding reflected radiation at or near a pre-set excitation wavelength from a gemstone by an optic fiber probe, wherein the radiation is rendered by coupling a light source with a first lens configured to collimate light from the light source, coupling the first lens with a short pass filter, coupling a second lens collecting light to send through a fiber optic probe, wherein the short pass filter is set at a first predetermined wavelength that is longer than the pre-set excitation wavelength;
   by the computing device, receiving, by the optic fiber probe, data from a fluorescence detector regarding fluorescence emission from the gemstone;
   wherein the fluorescence detector includes a long pass filter to render modified fluorescence emission, wherein the fluorescence detector includes a first and second fluorescence lens and the second fluorescence lens is placed at a distance which is fourth back focal length from the detector, wherein the long pass filter has a second predetermined wavelength;

by the computing device, filtering noise from material other than the gemstone, and determining if a subject gem is natural or synthetic based on one or more measurements of the filtered modified fluorescence emission, wherein the one or more measurements are obtained using a fluorescence detector.

10. The method of claim 9, further comprising:
conducting ambient light calibration.

11. The method of claim 10, wherein conducting ambient light calibration comprises:
touching the gemstone with the fiber optic probe while the light source is turned off;
measuring ambient light spectrum; and
calibrating for ambient light by setting the measured ambient light spectrum as the background spectrum for subsequent measurements.

12. The method of claim 9, further comprising:
conducting dark calibration.

13. The method of claim 12, wherein conducting dark calibration comprises:
collecting measurements of dark signals by eliminating light entry into the fluorescence detector; and
calibrating for dark signals by setting the measured dark signals as absence of optical signals.

14. The method of claim 9, wherein the one or more measurements are obtained with a fluorescence detector.

15. The method of claim 9, wherein the light source is an LED light source coupled with a band pass filter.

16. The method of claim 9, wherein the pre-set excitation wavelength is 405 nm or shorter.

17. The method of claim 9, wherein the pre-set excitation wavelength is 385 nm.

18. The method of claim 9, wherein the first predetermined wavelength is between 360 nm to 405 nm.

19. The method of claim 9, wherein the second predetermined wavelength is between 405 nm to 413 nm.

20. The method of claim 9, wherein the fiber optic probe is connected to an optical cable comprising two or more optical fibers.

21. The method of claim 9, wherein the optical cable connected to the fiber optic probe is split into at least two optical cables comprising a first optical cable connected to the LED light source and a second optical cable connected to the fluorescence detector.

22. A non-transitory machine-readable medium storing instructions for a gemstone screening application which, when executable by at least one processor, causes the at least one processor to perform operations comprising:
receiving reflected radiation at or near a pre-set excitation wavelength to a gemstone by an optic fiber probe,
wherein the radiation is rendered by coupling a light source with a first lens configured to collimate light from the light source, coupling the first lens with a short pass filter coupling a second lens collecting light to send through a fiber optic probe,
wherein the short pass filter is set at a first predetermined wavelength that is longer than the pre-set excitation wavelength;
receiving, using the optic fiber probe, fluorescence emission from the gemstone by a fluorescence detector;
receiving data regarding an applied long pass filter to the fluorescence emission to render modified fluorescence emission, wherein the long pass filter has a second predetermined wavelength, wherein the fluorescence detector includes a first and second fluorescence lens and the second fluorescence lens is placed at a distance which is fourth back focal length from the detector; and
filtering noise from material other than the gemstone,
determining whether the gemstone is synthetic or natural based on one or more received filtered measurements of the modified fluorescence emission.

* * * * *